Figure 1:
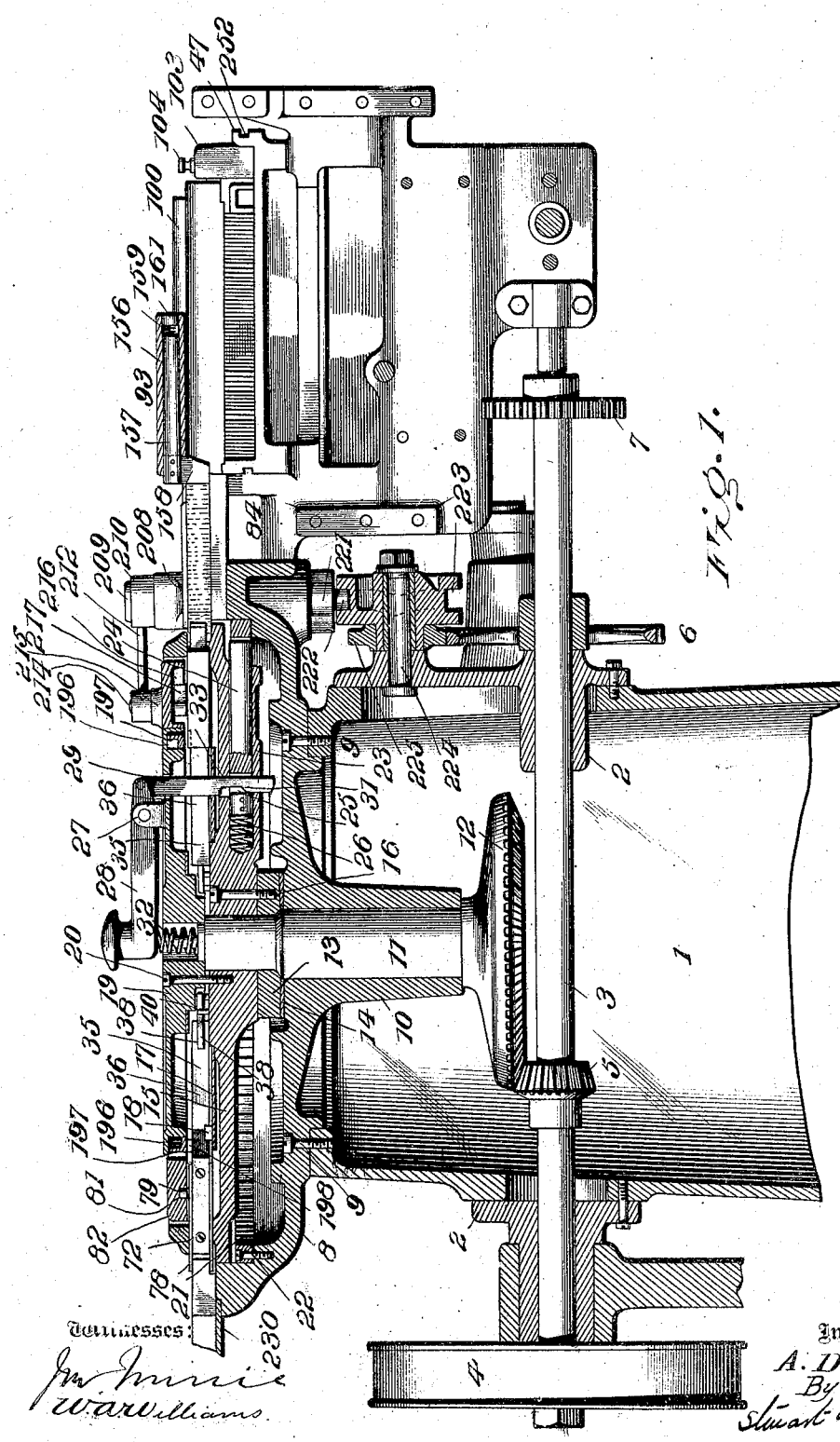

No. 858,584. PATENTED JULY 2, 1907.
A. DOW.
TYPE DISTRIBUTING MACHINE.
APPLICATION FILED AUG. 30, 1904.

14 SHEETS—SHEET 1.

Witnesses:
Inventor
A. Dow.
By
Stuart & Stuart
Attys.

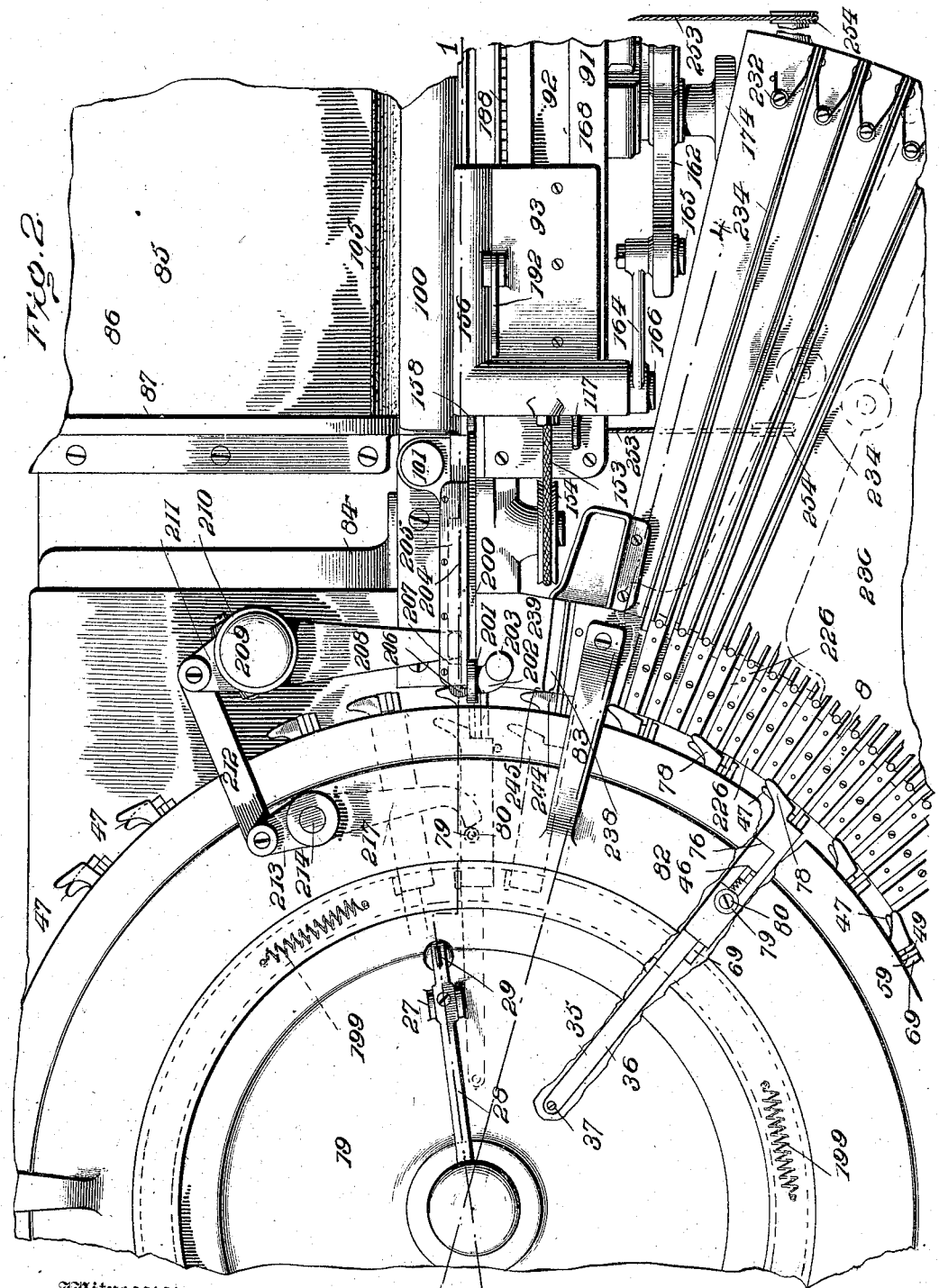

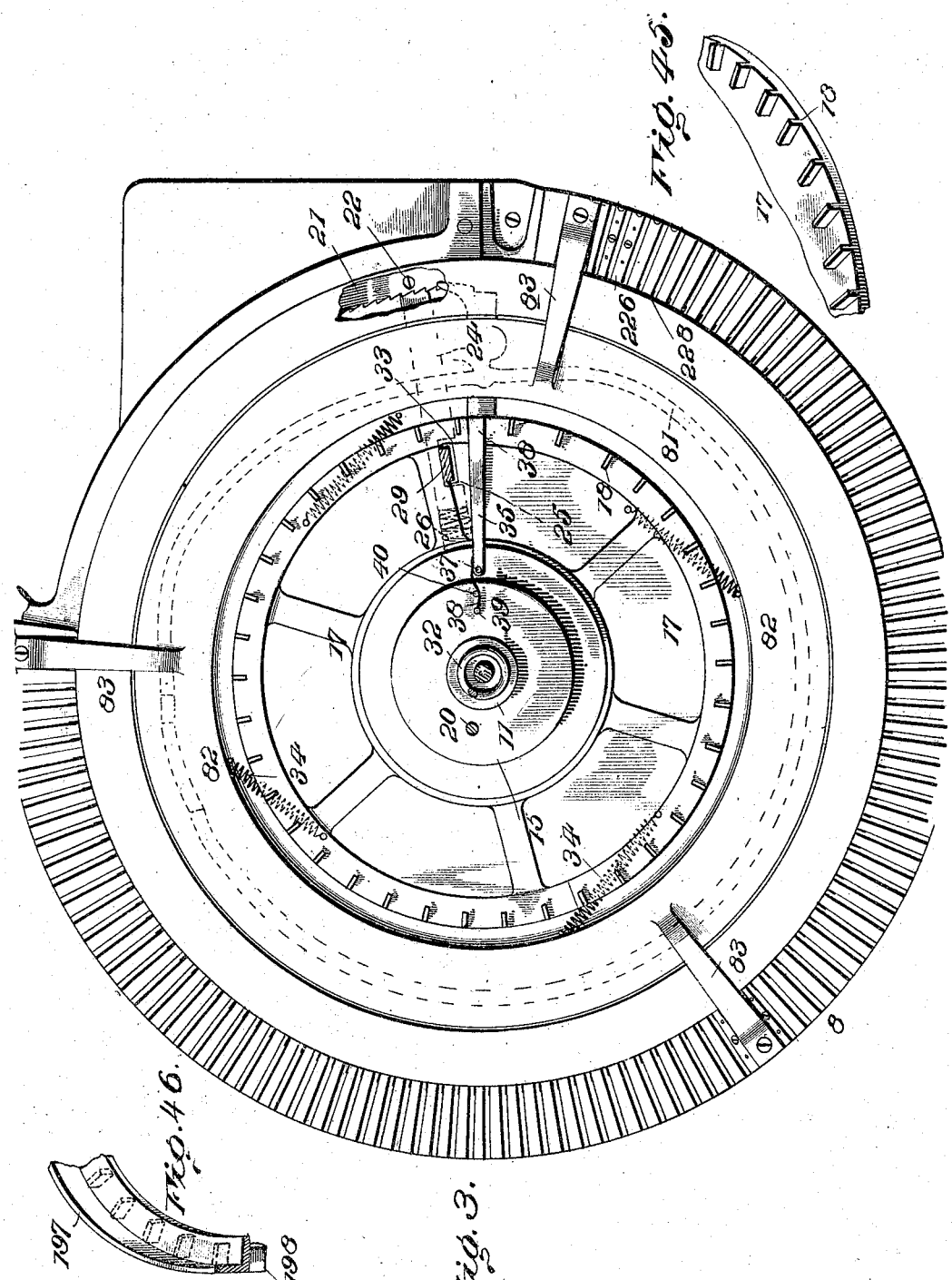

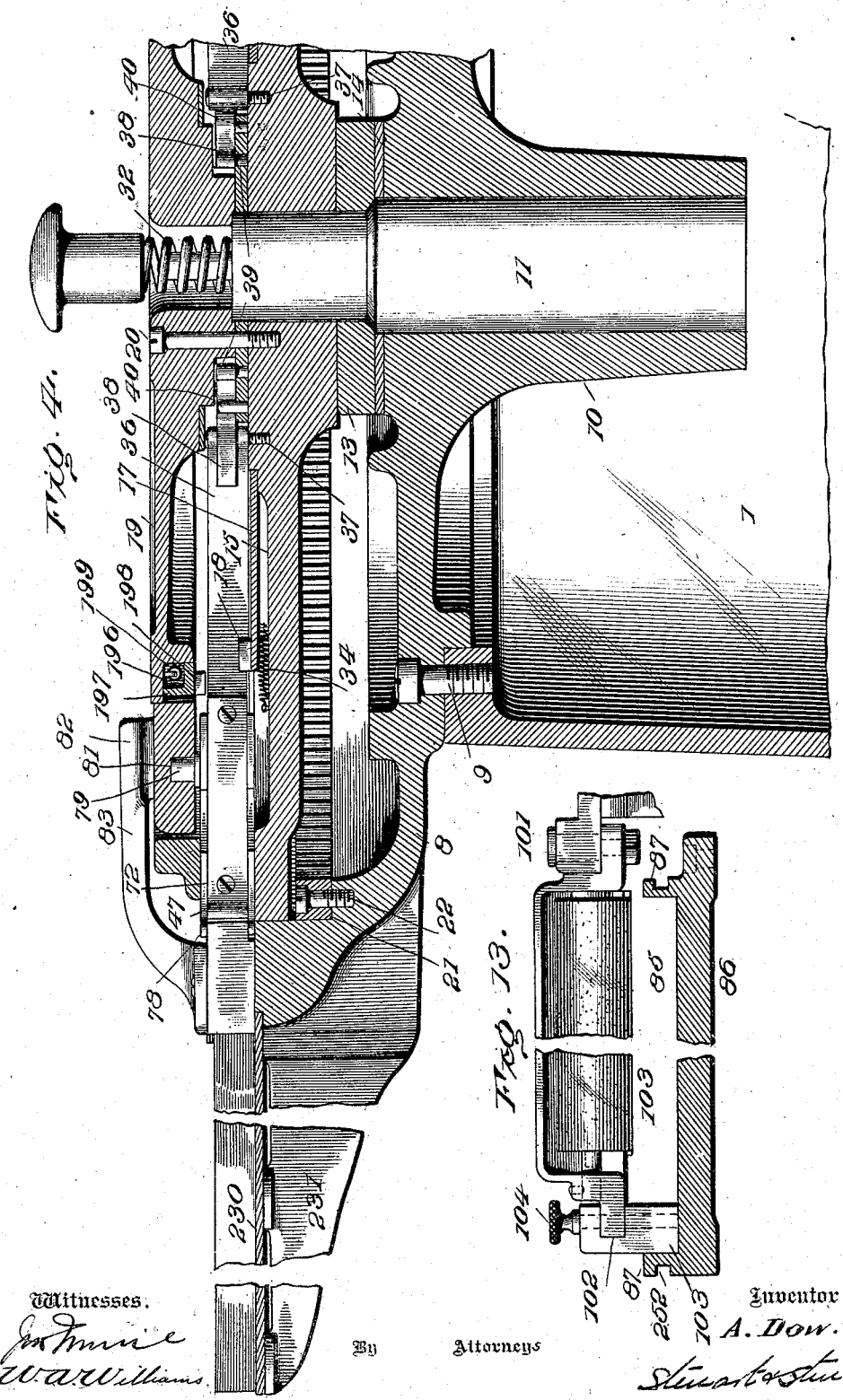

No. 858,584. PATENTED JULY 2, 1907.
A. DOW.
TYPE DISTRIBUTING MACHINE.
APPLICATION FILED AUG. 30, 1904.
14 SHEETS—SHEET 5.
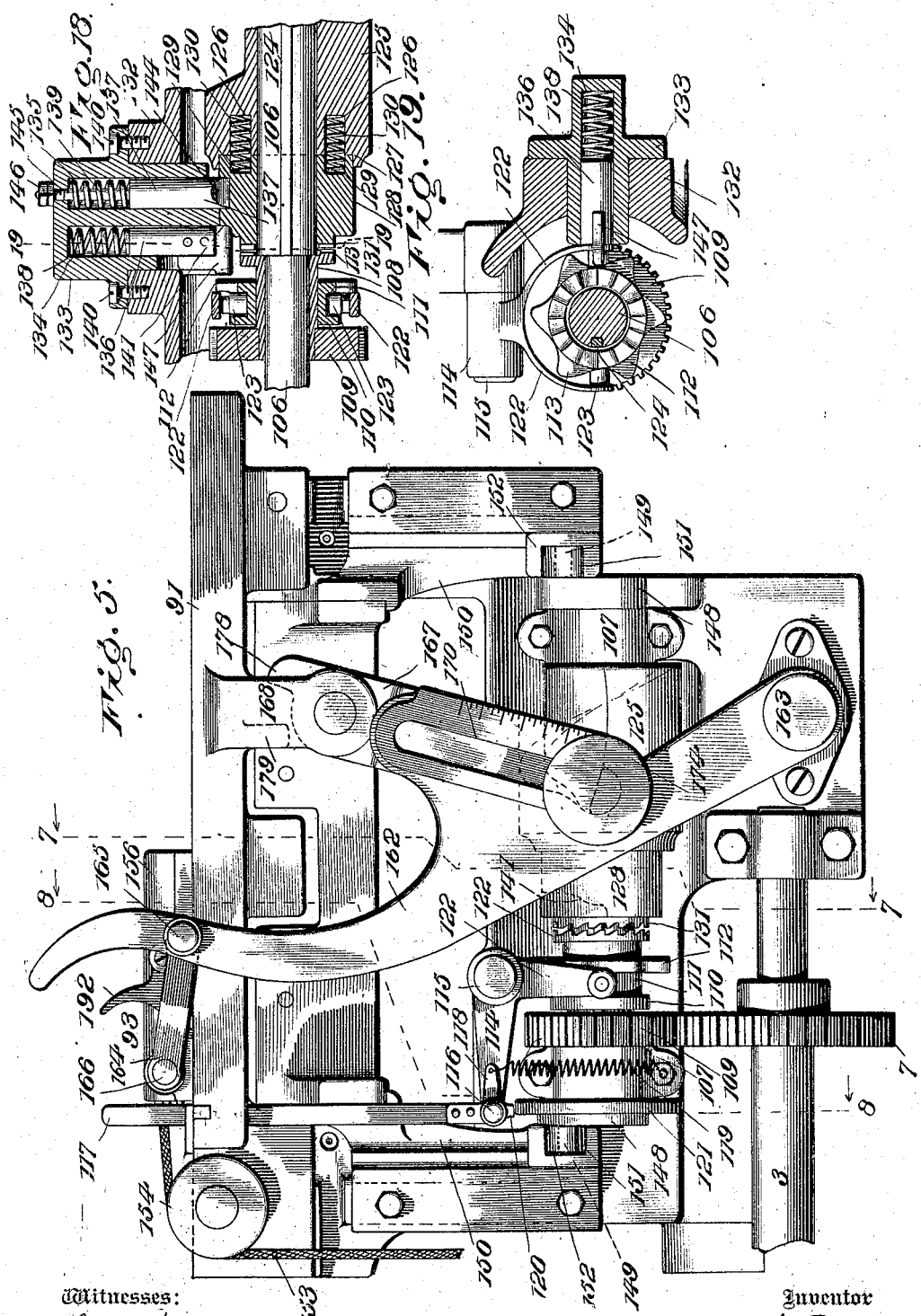
Witnesses:
Inventor
A. Dow.
By Attorneys
Stewart & Stewart

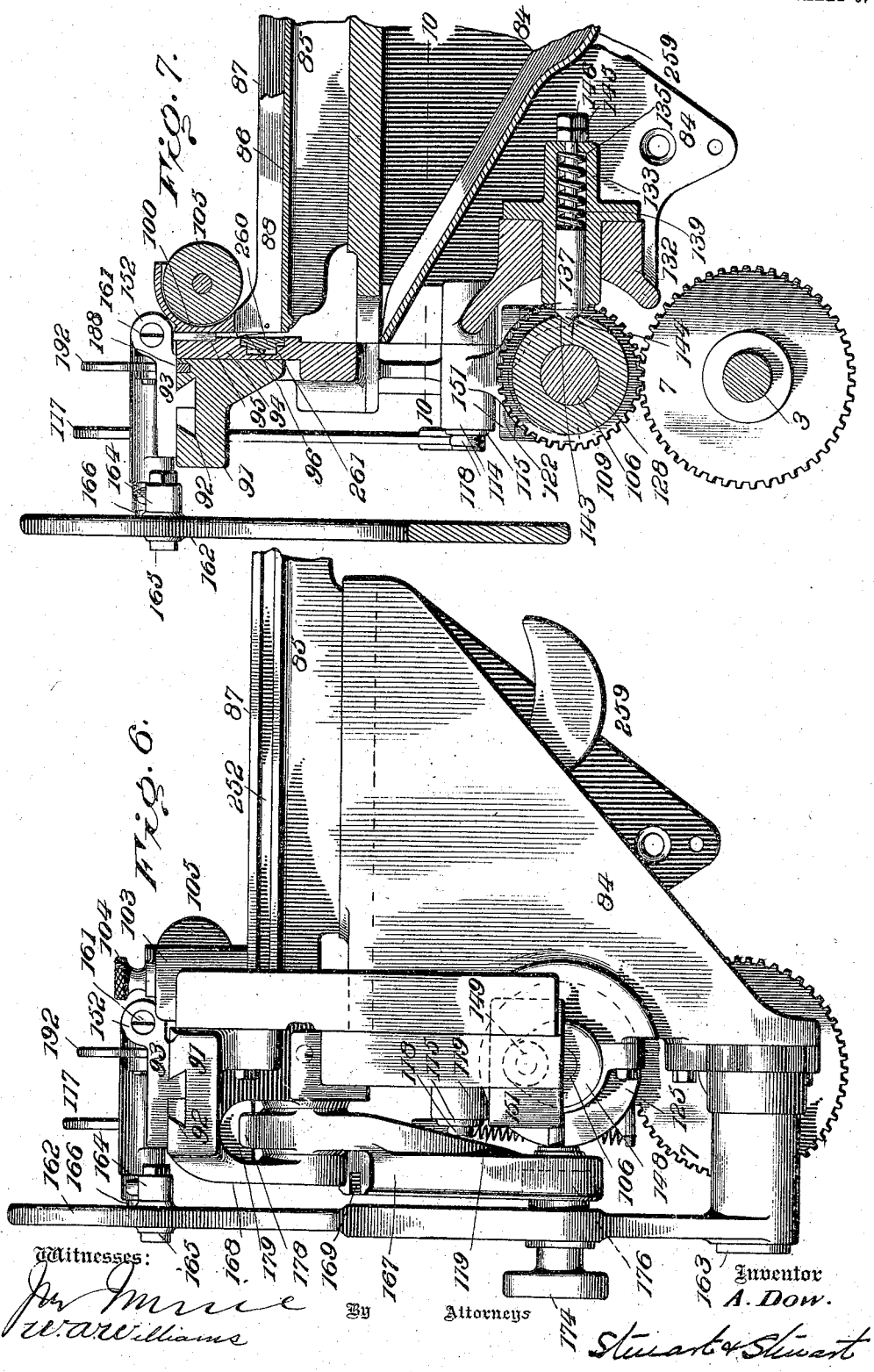

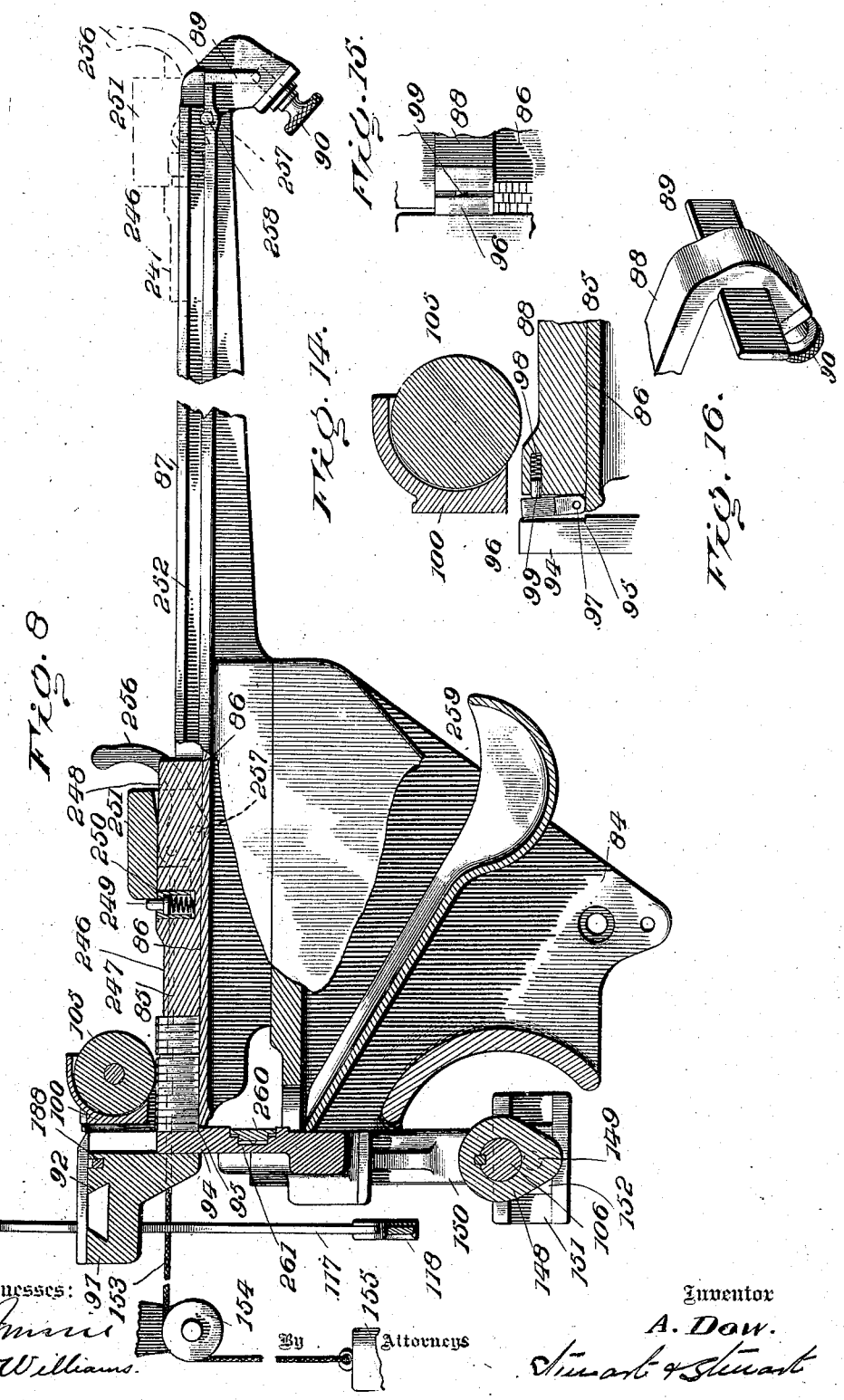

No. 858,584. PATENTED JULY 2, 1907.
A. DOW.
TYPE DISTRIBUTING MACHINE.
APPLICATION FILED AUG. 30, 1904.
14 SHEETS—SHEET 8.
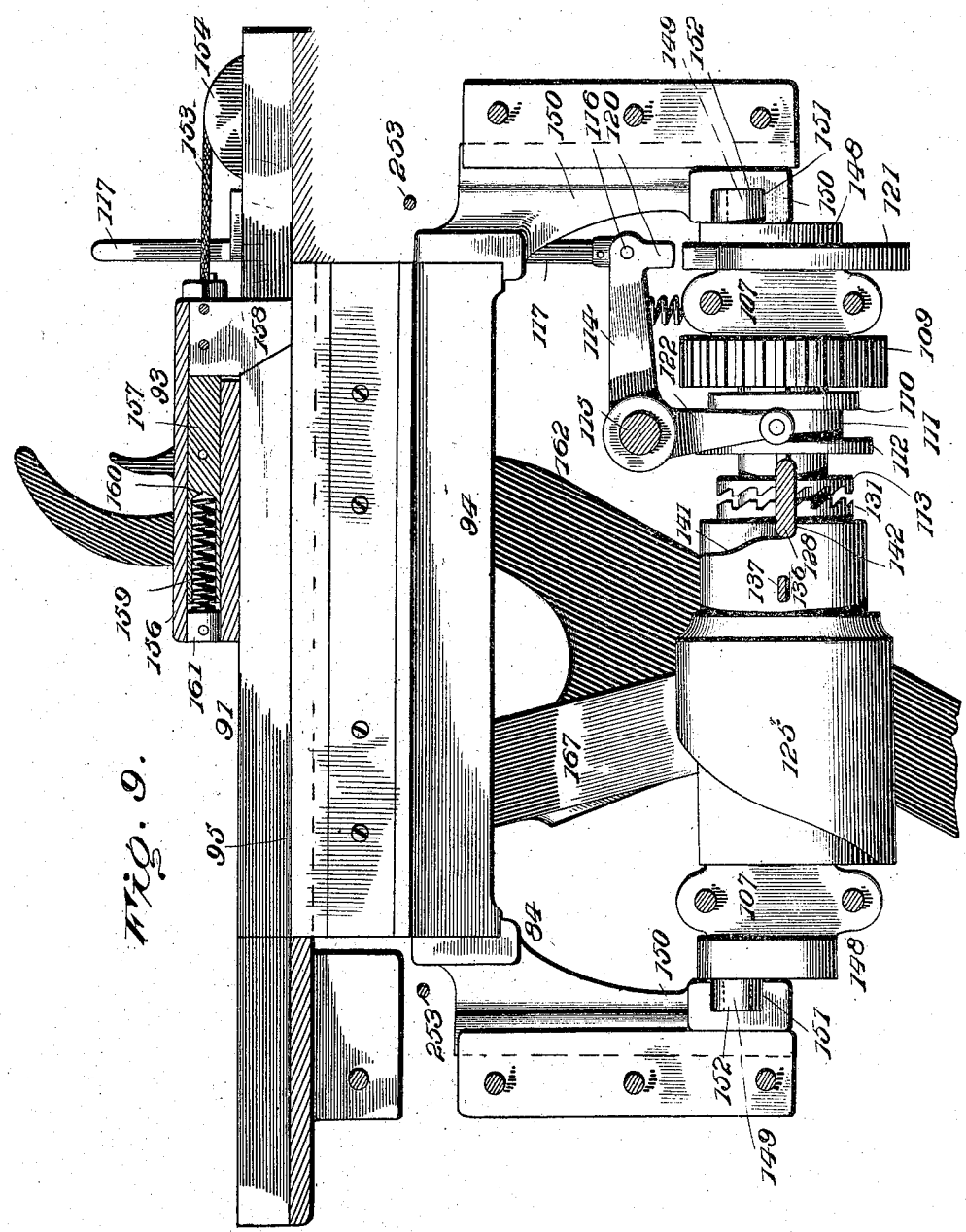

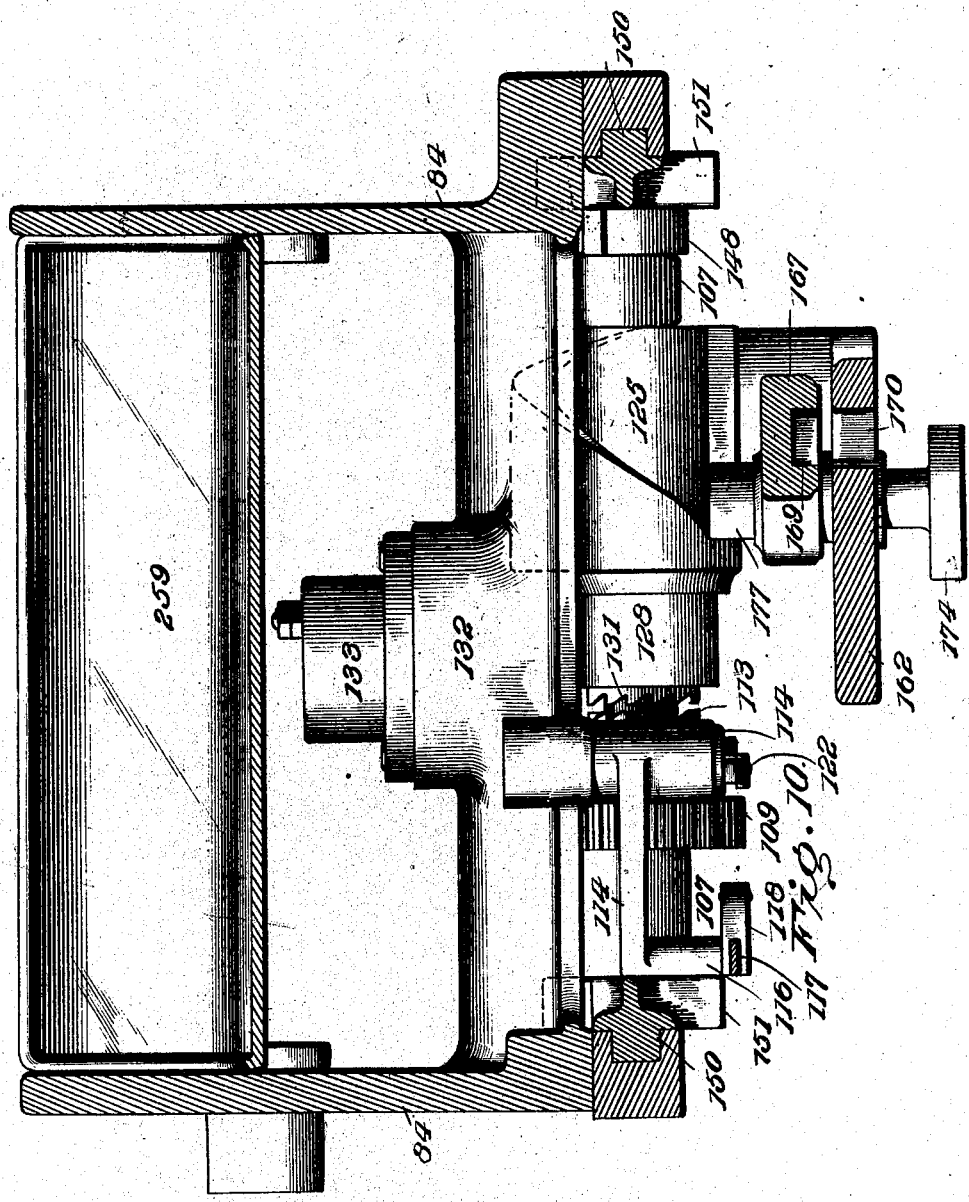

No. 858,584. PATENTED JULY 2, 1907.
A. DOW.
TYPE DISTRIBUTING MACHINE.
APPLICATION FILED AUG. 30, 1904.
14 SHEETS—SHEET 10.
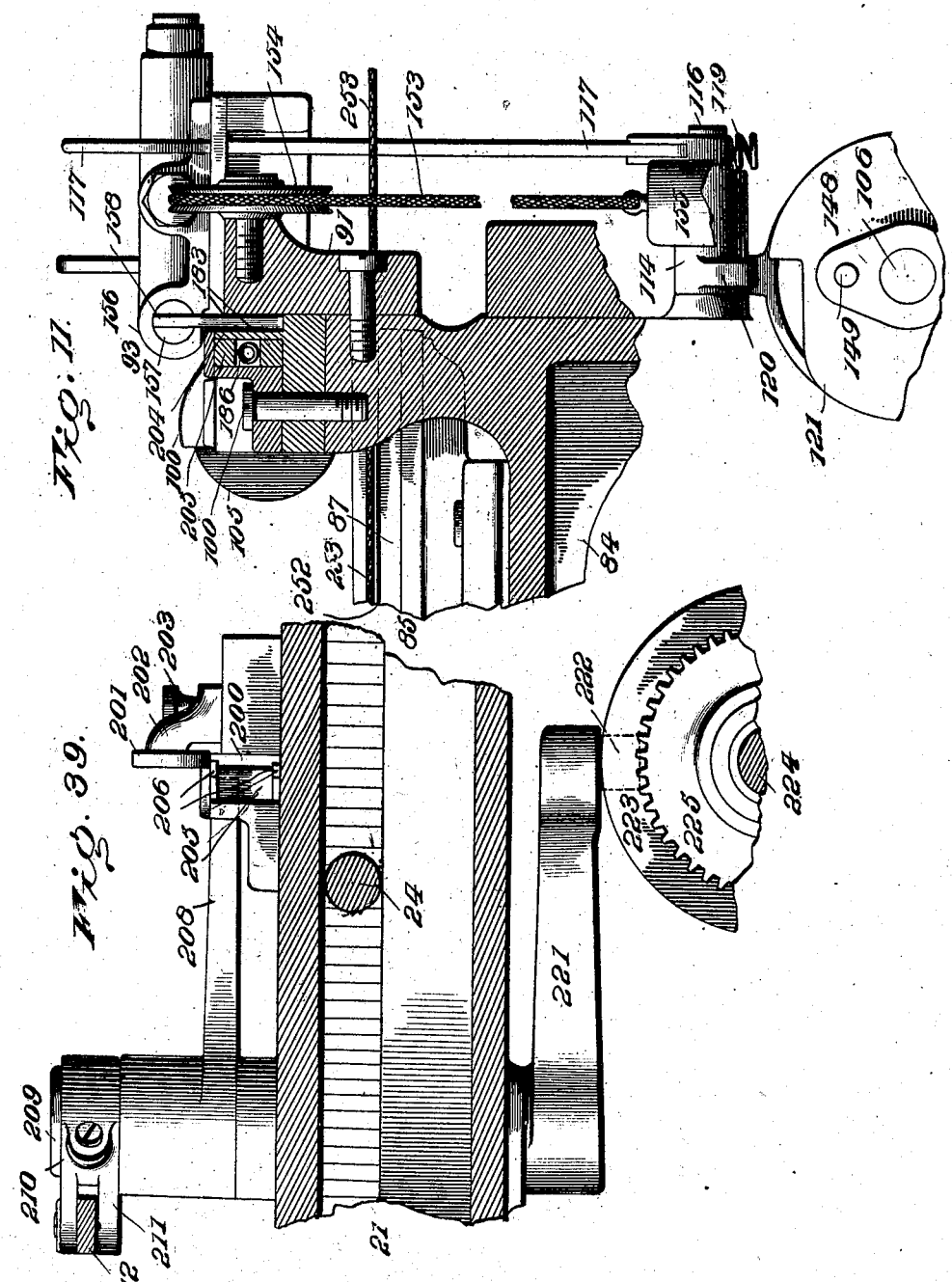

No. 858,584. PATENTED JULY 2, 1907.
A. DOW.
TYPE DISTRIBUTING MACHINE.
APPLICATION FILED AUG. 30, 1904.
14 SHEETS—SHEET 11.
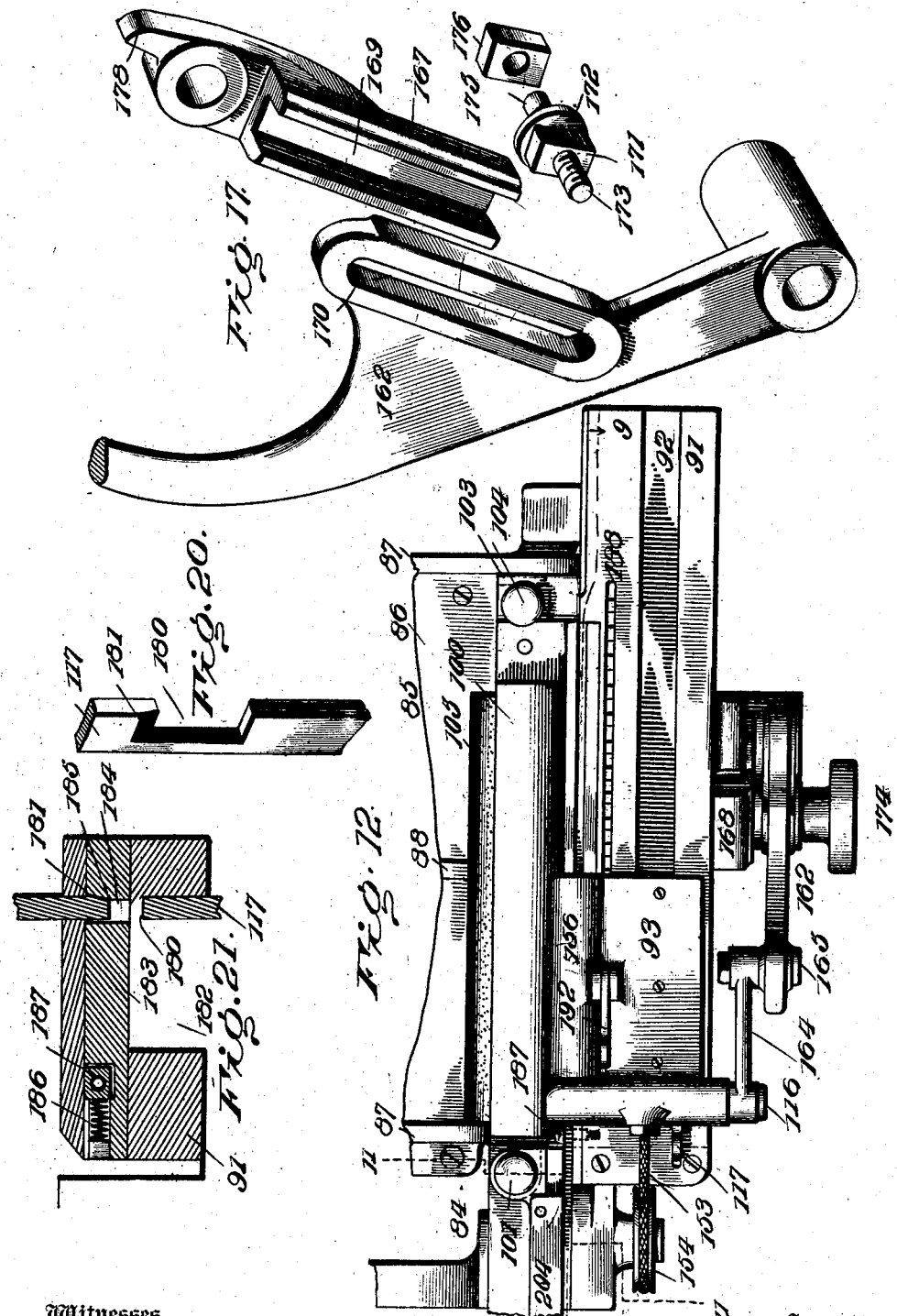
Witnesses.
Inventor
A. Dow.
By Stewart & Stewart
Attorneys

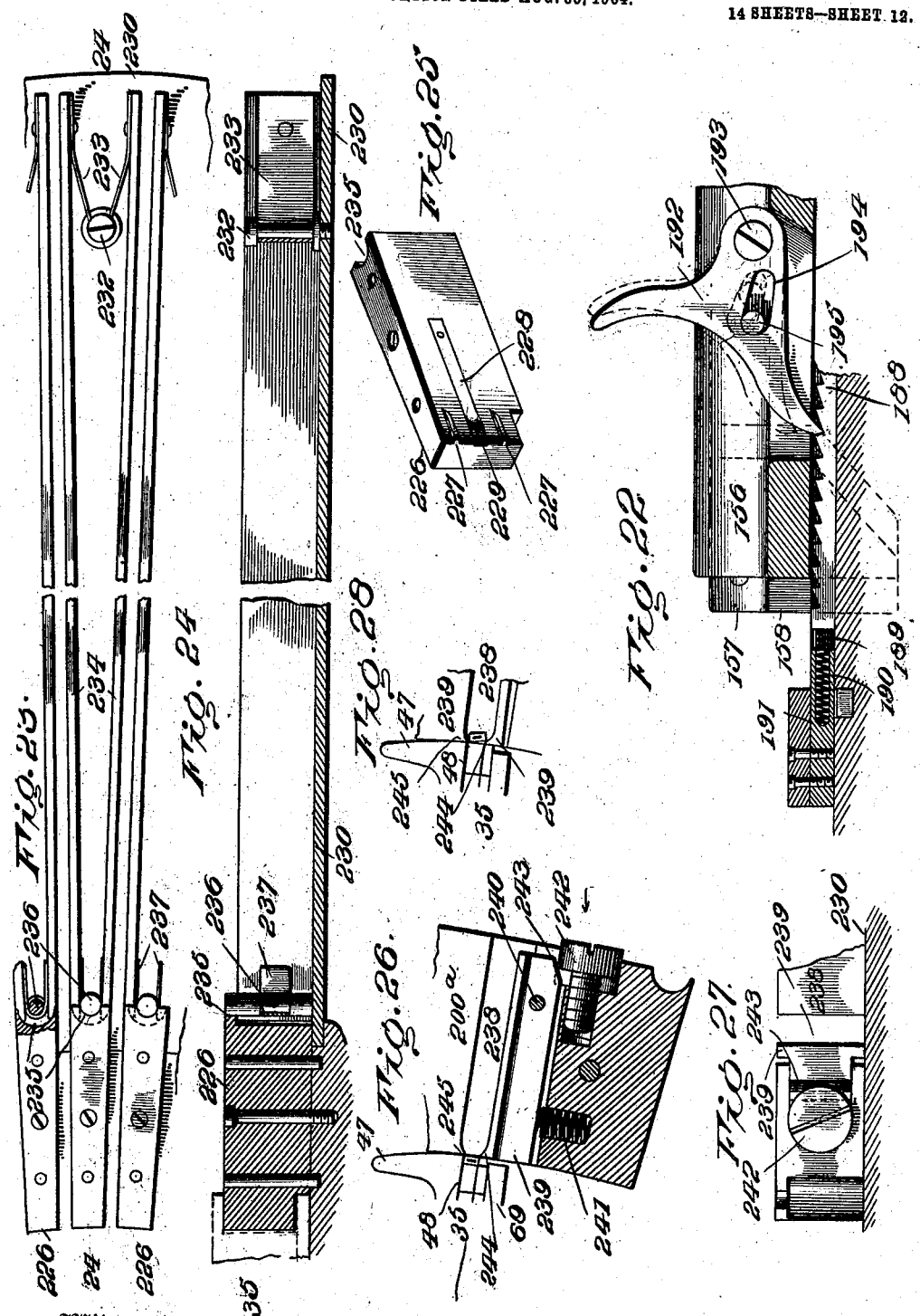

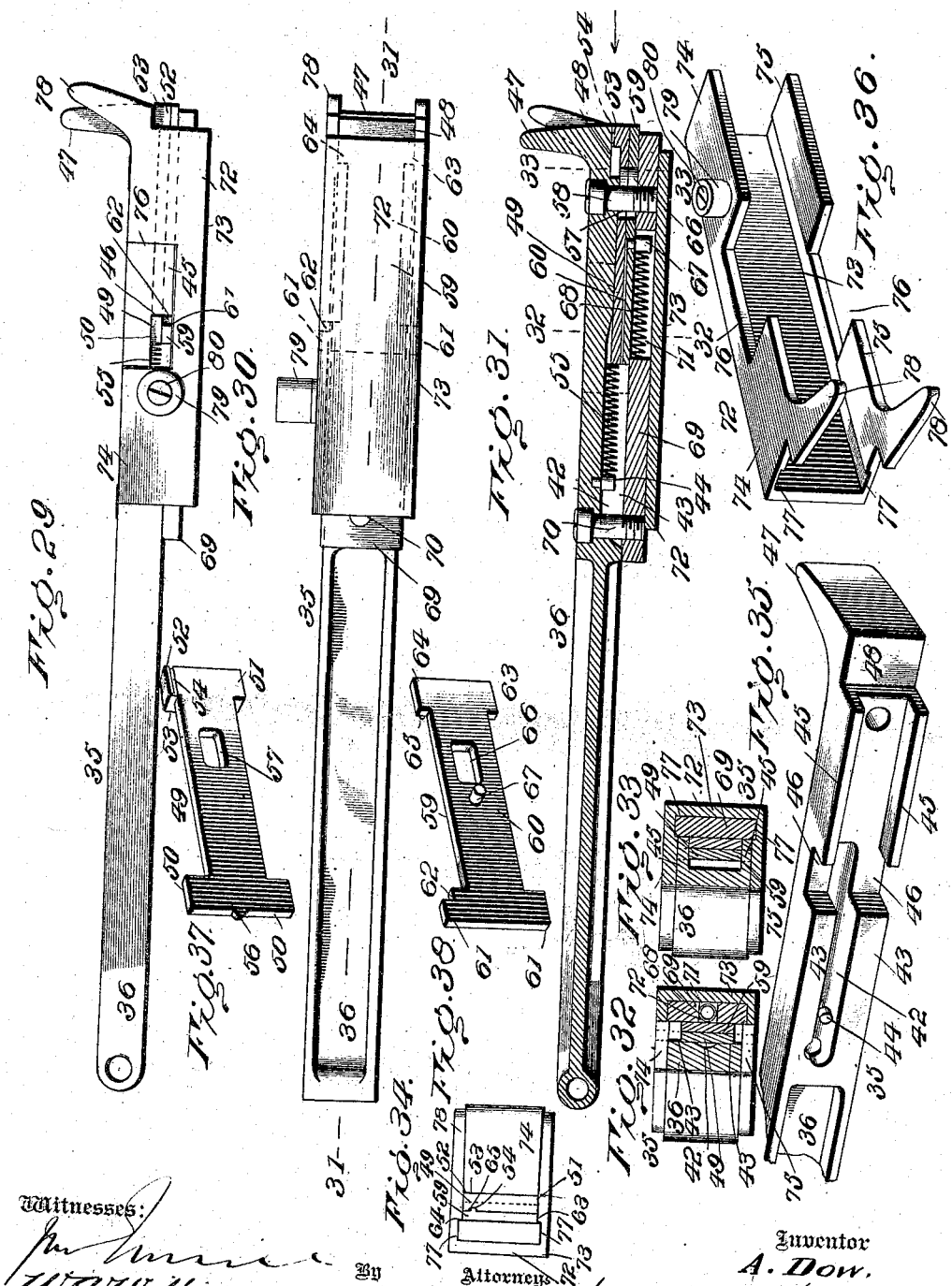

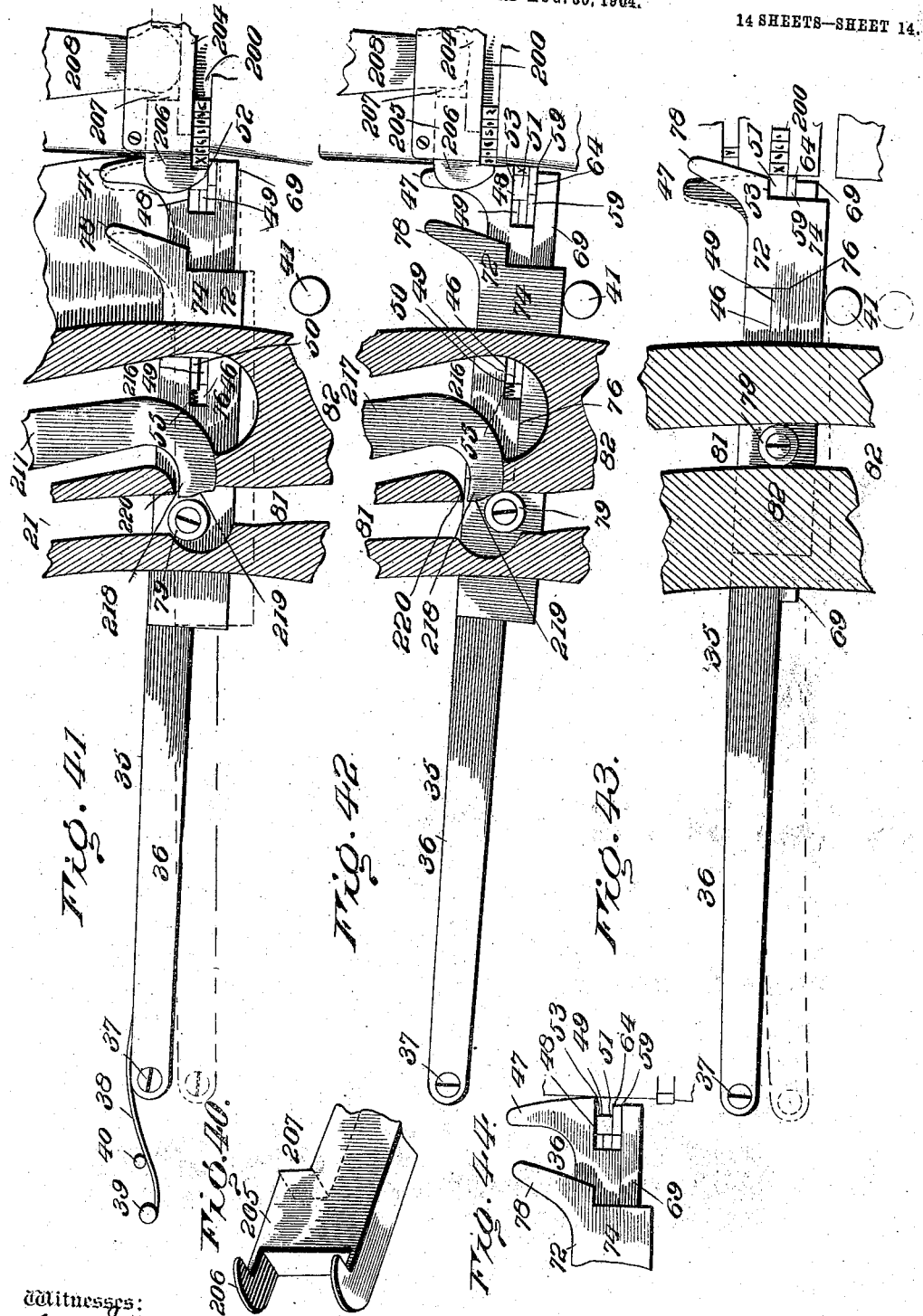

UNITED STATES PATENT OFFICE.

ALEXANDER DOW, OF NEW YORK, N. Y., ASSIGNOR TO DOW COMPOSING MACHINE COMPANY OF NEW YORK, OF NEW YORK, N. Y., A CORPORATION OF NEW YORK.

TYPE-DISTRIBUTING MACHINE.

No. 858,584.      Specification of Letters Patent.      Patented July 2, 1907.

Application filed August 30, 1904. Serial No. 222,951.

*To all whom it may concern:*

Be it known that I, ALEXANDER DOW, a citizen of the United States of America, and a resident of the city and county of New York and State of New York, have invented certain new and useful Improvements in Type-Distributing Machines, of which the following is a specification.

My invention relates to certain new and useful improvements in type distributing machines.

The object of my invention is to produce a type distributing machine which will be rapid and accurate in operation.

My invention broadly speaking, relates to improvements in the type of machine shown in the patent granted to me on the 24th day of November, 1896, and numbered 572,050.

While I have shown my improvements in connection with a machine of the general type shown in the patent above referred to, I desire to have it understood that I am not to be limited to such a construction as many of the features of my invention are capable of general use and it is my intention to use these structures in other relations than those shown herein.

In my present invention, I have improved the means for feeding the line from the galley into the line channel; I have improved the means for feeding the line along the line channel; the means for returning the line follower prior to feeding a new line in the line channel; means for controlling the line follower; the type carriers and the mechanism by which they are operated to cut off a single type; I have provided the machine with a means to remove any type not properly positioned in the type carriers; I have improved the mechanism for stopping the machine when any part fails to operate, and in fact have made improvements on most parts of the machine shown in my patent above referred to.

In the form in which I have illustrated these improvements, they are adapted to a construction of the general type of that shown in my prior patent, but this is only done for the sake of illustration and many changes may be made so as to adapt these improvements to other machines if desired.

Referring to the drawings wherein the same part is designated by the same reference numeral wherever it occurs, Figure 1 is a vertical central section taken on the line 1, 1, of Fig. 2, through the line channel and the center shaft of the machine. Fig. 2 is a top plan view of the machine, partly broken away. Fig. 3 is a top plan view of the distributing part of the machine, partly in section and partly broken away to more clearly show the construction. Fig. 4 is a vertical section taken on line 4—4, of Fig. 2, viewed from the galley side. Fig. 5 is a rear elevation of the line feeding mechanism. Fig. 6 is a side elevation of the line feeding mechanism. Fig. 7 is a vertical section of the line feeding mechanism taken on the section line 7—7 of Fig. 5. Fig. 8 is a vertical section taken on line 8—8, of Fig. 5, looking in the direction of the arrow. Fig. 9 is a vertical section taken on line 9—9 of Fig. 12. Fig. 10 is a horizontal section taken on line 10—10, of Fig. 7. Fig. 11 is a vertical section taken substantially on line 11—11, of Fig. 12. Fig. 12 is a top plan view of the line feeding mechanism. Fig. 13 is a detail view of the roller for leveling the type on the galley. Fig. 14 is a detail sectional view showing one end of the side stick. Fig. 15 is a detail plan view of one end of the side stick showing its mode of operation. Fig. 16 is a detail perspective view of the other end of the side stick from that shown in Fig. 15. Fig. 17 is a detail perspective view of the parts forming the return lever of the follower showing the parts forming the lever separated. Fig. 18 is a sectional view of the clutch and its releasing mechanism. Fig. 19 is a sectional view taken on line 19—19, of Fig. 18. Fig. 20 is a detail perspective view of a part of the clutch operating trip arm. Fig. 21 is a detail sectional view showing the manner of holding the line lock out of engagement with the line. Fig. 22 is a detail vertical sectional view of a part of the line follower and a part of the guide for the same. Fig. 23 is a top plan view of several of the type receiving channels. Fig. 24 is a vertical section taken on the line 24—24, Fig. 23. Fig. 25 is a perspective view of one of the channel blocks which carry the wards and form the receiving ends of the type receiving channels. Fig. 26 is a top plan view, partly in section of the device adapted to receive all the type improperly placed in the type carriers. Fig. 27 is a view of Fig. 26, looking in the direction of the arrow. Fig. 28 is a plan view showing the operation of this receiver. Fig. 29 is a top view of one of the type carrying arms. Fig. 30 is a side view of the same. Fig. 31 is a central longitudinal sectional view taken substantially on line 31—31, Fig. 30. Fig. 32 is a sectional view taken on line 32—32 of Fig. 31. Fig. 33 is a sectional view taken on line 33—33 Fig. 31. Fig. 34 is an end view of the carrier. Fig. 35 is a perspective view of the operating end of a type carrying arm with parts removed. Fig. 36 is a perspective view of the casing of the carrier. Fig. 37 is a perspective view of the ejector plate. Fig. 38 is a perspective view of the side plate. Fig. 39 is a sectional view showing the mechanism for controlling the movement of the type controlling fingers as well as the casing of the carrier arms when they receive a type. Fig. 40 is a detail perspective view of the type controlling fingers. Fig. 41 is a plan view partly in section illustrating in full lines the position of the type carrier when it has just come to the position to cut off a type and in dotted lines the position it assumes in cutting off a type of some considerable thickness. Fig. 42 is a view similar to Fig. 41 showing the position of the parts just after a type has been cut off. Fig. 43 is a view showing a type being inserted into its proper receiving channel. Fig. 44 is a detail view showing the position of the parts of the carrier just prior to their moving into the position to cut off a type. Fig. 45 is a detail perspective view of a part of the locking ring, and Fig. 46 is a detail perspective view of a part of the assisting ring.

Referring to the figures: 1 designates the base of the machine, which in the form of my invention shown, is of general cylindrical design.

2—2 are bearings secured to the opposite sides of the base in which is mounted the main shaft 3. Mounted on one end of the main shaft 3 is the driving pulley 4, preferably this driving pulley is connected to the main shaft 3 by a frictional connection of any suitable kind, so that when the drive shaft encounters more than a predetermined amount of resistance, the shaft may stop and the pulley slip on the shaft.

5 is a bevel gear fast on the shaft 3 within the base 1 and 6 and 7 are gears fast on the shaft 3 outside of the base.

Mounted on the top of the base 1 is the bowl-shaped frame 8 which is secured to the base 1 by screws 9 or in any other suitable manner. The frame 8 has formed centrally therein the journal 10 in which is mounted the shaft 11 carrying at its lower end the bevel gear 12, meshing with the bevel gear 5, whereby the shaft is driven from the drive shaft 3.

13 is a collar shrunk on the shaft 11, and 14 is a washer between the collar 13 and the top of the bearing 10. By means of the collar 13, the shaft 11 is supported in the bearing 10.

15 is a circular disk which is mounted on the upper end of the shaft 11 and is secured to the collar 13 by the screws 16. On the upper face of the circular disk 15 is formed a projecting hub on which is loosely mounted a ring 17, which has on its upper face the series of radial lugs 18.

19 is a cover plate which is secured to the disk 15 by the screws 20. From this construction, it will be seen that the disk 15 and the cover 19 will rotate with the shaft 11.

Around the inner face of the bowl shaped frame 8 is formed a ledge to which is secured the ring 21 having a series of ratchet teeth upon its interior surface. The ring is held in place by the screws 22. The ledge is of such a height that the ring 21 stands just below the edge of the disk 15. On the under portion of one side of the disk 15, I provide a projection 23, which is bored radially of the disk and in which is mounted a plunger 24, which on its outer end is provided with ratchet teeth to engage with the internal teeth on the ring 21. The plunger 24 is provided between its ends with a transverse opening 25. The plunger is in the same plane as the ring 21, so as to engage it, and is pressed toward the ring by the spring 26, mounted between the inner end of the plunger and the end of the bore of the projection 23, the tendency of the spring is to force the teeth of the plunger into engagement with the teeth of the ring 21.

27 are a pair of ears projecting up from the cover 19 and located over the plunger 24. Pivoted in these ears is a lever 28, to one end of which is pivoted the latch 29 which passes through the transverse opening 30 in the plunger 24. The latch 29 also passes through suitable guide openings in the disk, whereby the latch is held from lateral movement.

31 is a notch in the side of the latch of such a width and such a depth that when it is in line with the plunger 24, it will allow the plunger to move outwardly under the influence of the spring 26 and engage the teeth on the ring 21.

32 is a spring, one end of which rests against the top of the shaft 11 and the other end against the under side of the lever 28 which through the lever tends to force the latch into the position where its notch 31 will be in line with the plunger 24. In order to hold the bolt or plunger 24 out of engagement with the teeth of the ring 21, it is necessary to hold the latch in the position shown in Fig. 1. In the form of construction shown, the ring 17 is formed as a spider and one of the arms 33 of the spider (see Fig. 3) is adapted to engage a notch cut in the side of the latch 29 to hold the latch in the position shown in Fig. 1, and is maintained in engagement with the notch by the springs 34, one end of each of which is secured to the disk 15 and the other end to the ring 17. When therefore the clutch ring 17 is rotated in the direction opposite the pull of the springs 34, in relation to the disk 5, the arm 33 will become disengaged from the latch 29, allowing the spring 32, to force the latch down and allow the bolt 24 to move outwardly, under the influence of the spring 26, and engage the teeth on the ring 21 and lock the disk to the ring. The locking of the disk 15 and ring 17 stops the shaft 11, which through the gears 12 and 5, stops the main shaft 3. Because of the frictional connection between the main shaft 3 and the driving pulley 4, this can readily be accomplished without injury.

Carried on the disk 15 are a series of type carriers 35 and in the machine shown there are thirty-six of these carriers. These carriers (see Figs. 2 and 3) are each composed of an arm 36 pivoted on a stud 37, extending up from the disk 15.

38, Fig. 4, is a spring, one end of which is secured to the pin 39, the other end of which rests against the arm 36, just beyond the pivot 37.

40 is a pin located between the pin 39 and the pivot 37, to form a fulcrum point for the spring 38.

41 is a stop located near the outer end of the carriers 36, against which the carrier is yieldingly held by the spring 38.

Referring now particularly to Figs. 29 to 36, inclusive, I will describe specifically the construction of one of the type carriers, it being of course, understood that all the carriers are alike.

Referring to Fig. 35, in which the outer end of the arm 36 is shown in detail, 42 is a longitudinal groove cut into the side of the arm, leaving two side walls 43—43. This groove is for the reception of a spring hereinafter described and 44 is a pin in the bottom of the groove 42, against which one end of this spring rests.

45—45 are walls extending from the side of the arm and separated from the walls 43—43 by the notches 46—46. These notches do not extend to the full depth of the groove 42 and the groove 42 terminates about in line with the walls of the notches 46 formed by the end of the side walls 45.

47 is a heel extending back from the side of the arm opposite that carrying the walls 43 and 45, and the outer face of this heel is cut on the arc of a circle whose center is the pivot of the arm 36. The walls 45 do not extend to the end of the arm, but are cut off a short distance from the end so that the end of the arm on side of the walls is formed with a face 48 which is in a plane parallel to the axis of the arm, this face forming one of the sides of the receiving chamber in which the type are carried.

49 is the ejector which is shown in detail in Fig. 37. This ejector consists of a body portion adapted to fit into the channel formed by the walls 45, and right angled extensions extending out from each side of the body portion at each end thereof. The extensions 50 at the rear end of the body portion are adapted to stand in the notches 46, the extensions being narrower than the notches so that the ejector can move longitudinally in relation to the arm. The ejector at its forward end is provided with extensions 51—52, and one side of the forward end is provided with a projection 53 which projects laterally from the body portion so that when the ejector is in position, the projection will rest against the face 48, as is shown in Fig. 31. The extension 52 is provided on the side opposite the projection 53 with a notch 54 extending longitudinally of the arm and located near the outer end of the extension, the function of which will be hereinafter explained.

55 is a spring placed in the groove 42, one end of the spring resting against the pin 44 in the groove and the other end of the spring engaging a projection 56 on the rear end of the ejector.

57 is a slot to allow a screw 58 which secures the parts of the carrier together to pass through the ejector.

59 is what I term a side plate and comprises a central body portion 60 and the lateral projections 61—61 at its rear end, these projections 61 being provided with steps 62, on their inner edges. The body portion at its forward end is provided with the extensions 63—64, projecting from either side of the body portion. The projection 64 is provided with a ward 65 extending in a direction longitudinal of the body portion and located near the outer end of the extension 64 for a purpose to be hereinafter described. The side plate is also provided with the opening 66, similar to the opening 57, in the ejector plate and for the same purpose.

67 is a post located at about the center of the side plate against which rests one end of the spring 68. The side plate 59 is located between the walls 45 and against the ejector, as best shown in Fig. 31, with the ward 65 on the side plate extending into the groove 54 in the ejector. The inner face of the side plate forms one wall of the type receiving chamber, the face 48 forms the opposite wall and the end of the ejector forms the rear wall of the chamber, the width of the end of the ejector is slightly less than the width of the type the machine is adapted to distribute.

69 is a cover plate which rests upon the top of the walls 43 and 45 and projects beyond the outside edges of these walls for a purpose to be hereinafter described. The cover is secured in position by means of the screws 58 and 70. The cover is provided with the slot 71 in which the spring 68 is located, one end of the spring resting against the end of this slot.

72 is a casing which extends around three sides of the arm and actuates the side plates and ejector. This casing is formed of the body portion 73 and the side walls 74—75, extending at right angles from the body portion. About central of the side walls they are notched at 76 and into these notches project the extensions 50—64 of the ejector and side plate. The side walls are each provided with a groove 77 into which extend the projecting edges of the cover plate 69 to hold the casing in position while allowing it to move longitudinally.

78—78 are cam projectings extending out from the end of the side walls 74—75 and adapted to force the type into their channels after they have been distributed in a manner to be hereinafter described.

79 is a cam roller secured by screw 80 to the side wall 74 of the casing by which the casing is moved longitudinally of the type carrier to effect the required movements of the ejector and side plate and to bring the cam projections 78 into position to operate on the distributed type, all as will be hereinafter described.

81 is a cam groove, approximately circular, cut in the under side of a ring 82 which is supported by the arms 83 extending out from the ring and secured to the upper surface of the frame 8. The cam groove 81 is engaged by the cam rollers 79 of the type carriers. This cam groove is so plotted that it will cause the casing of each carrier as it passes each receiving channel to project its type controlling cams 78 over the channel a distance equal to the thickness of the particular type designed to be inserted in that channel.

Referring to Figs. 2 and 8: mounted on the frame 84 which is secured to the main frame, is a galley 85 on which the matter to be distributed is placed. This galley is of ordinary form and consists of the bed 86 and side rails 87, and is of sufficient width to accommodate any column of type which it may be desired to distribute, or it may be of a sufficient width to accommodate a plurality of columns.

In order to provide for the handling of columns of less width than the maximum width, I provide an adjustable side stick 88, which is adapted to stand longitudinally of the galley, one end of which hooks over a depending flange 89 on the end of the galley, this end being provided with a set screw 90 by which it may be clamped to the flange 89, thereby holding the stick in its adjusted position, the construction of the other end of the stick will be hereinafter described.

Referring to Figs. 6, 7 and 8, 91 is a bracket carried by the frame 84, and is located in front of the inner or delivery end of the galley. This bracket is provided on its top surface with a dove-tailed channel 92 in which slides the line follower 93. Mounted between the bracket 91, and the end of the galley is the elevator 94, which is in the form of a vertically reciprocating plate and extends across the end of the galley. It is provided on its face opposite the end of the galley with a horizontal shoulder 95 upon which type are adapted to be forced and which forms one side and the bottom of the channel through which the line is fed to the distributer. I provide means for reciprocating the elevator from a position in which its shoulder is on the level of the bottom of the galley, to a position in which the type may be fed off the shoulder through the machine to the distributing mechanism. That is to say the elevator is adapted to move from the position shown in Fig. 8 to the position shown in Fig. 7. The elevator is of a length equal to the width of the galley hence when a line of type of a width less than the galley is forced onto the shoulder 95, the end of the type might fall down. In order to prevent this I provide the end of the side stick 88 with a latch 96 pivoted at 97 in the end of the stick and pressed forward by the spring 98 through the pin 99 so that when the elevator is depressed as shown in Fig. 14, the latch 96 will extend over the shoulder 95 and prevent the type from falling.

100 is a bar which extends across the galley over its delivery end at a height slightly greater than the height of a type. This bar is pivoted at one end to the frame by the pivot 101 and the other end of the bar is adapted to enter a slot 102 in a post 103 supported by the galley the bar being held in position by the screw 104 in the post. The forward face of the bar 100 forms one side of the type channel through which the type are fed to the distributing mechanism, the other side being formed by the rear face of the elevator 94 above the shoulder 95, with the distance between the inner face of the bar 100 and the side of the elevator above the shoulder slightly greater than the width of the type. Mounted in a curved recess in the bar is a roller 105 which extends below the lower face of the bar so that it will be in contact with the top of the type and force all type passing under it down so that they will rest on their feet on the galley.

Sliding on the galley 85 is a block 246 which is placed behind the matter to be distributed on the galley and preferably this block is of the form shown in which the portion 247 is of a thickness which will allow it to pass under the roller 105 in order that the last line of type may be fed up, and the rear portion 248 of a slightly greater thickness so that it cannot pass under the roller. 249—249 are a pair of pins mounted in the block and pressed up by the springs 250.

251 is a cross bar which extends across the galley, the ends of which engage grooves 252 in the side rails 87 of the galley. This bar is so located that the type may be slipped under it. The front end of the bar is adapted to make contact with the pins 249—249.

253 are cords attached to the cross bar 251 running over pulleys 254 on the frame of the machine and to the ends of these cords are attached the weights 255 whereby the column of type in front of the block 246 is held against the face of the elevator 94 and as each line of type is taken off the front of the matter on the galley, the matter is fed up to keep the front line of type in position to be elevated into the line channel. 256 are handles pivoted to the sides of the bar 251. These handles are provided with hooks 257 on their lower sides which are adapted to engage pins 258 on the back of the galley as indicated in dotted lines in Fig. 8, whereby when the bar 251 has been pulled back by the handles it can be held in the dotted line position shown in Fig. 8. The advantage of this construction is that when it is desired to replenish the supply of type on the galley, the type matter to be supplied is slid onto the galley behind the block 246. The operator takes hold of the handles 256 pulling the bar 251 back over the type on the galley and by means of the pins 257 the bar can be held in its rear position. The block 246 is now removed from behind the type which has previously been on the galley and the matter newly placed on the galley is moved up against the old matter and the block placed behind the new matter. When now the hooks 257 are raised by means of the handles 256, the bar will move forward under the action of the weight 255, until the front edge of the bar comes in contact with the pins 249, thus the new matter will be moved into position to be fed up to the distributer with but a very slight if any loss of time.

As it frequently happens that the matter to be distributed is leaded it is necessary to provide means whereby the leads will be removed as they present themselves at the elevator. 259 is a receptacle placed under the galley with its receiving end located adjacent to the lower end of the elevator and in position to receive a lead when drawn down by the elevator from the line. In order to allow the elevator to pull down a lead, I provide the same with a plate 260 which is set in a slot 261 cut in the inner side of the face of the elevator 94. This plate is adapted when the elevator descends to contact with the top edge of the lead and draw the same down between the elevator and the front end of the galley.

Referring now to Figs. 5, 18 and 19: 106 is a shaft mounted in bearing 107—107, just above the shaft 3. 108 is a sleeve loose on the shaft 106 and fast to one end of the sleeve is a gear 109 which meshes with the gear 7 on the shaft 3. Feathered on the sleeve 108 is a collar 110 which is provided with a peripheral groove 111 around the middle portion thereof and at the end of the collar furthest from the gear 109 is a star wheel 112. The end of the sleeve opposite that which carries the gear 109 is provided with the teeth 113 which form the engaging teeth of a clutch.

114 is a bell crank lever pivoted at 115 to the support 84.

116 is a pivot carried at one end of the bell crank lever and pivoted to 116 is the trip lever 117. The trip lever 117 is in the form of a bell crank being provided with a short projecting arm 118 to the outer end of which is secured one end of the spring 119, the other end of the spring being secured to the frame 84. Projecting downwardly from the end of the bell crank 114, at which the trip lever 117, is pivoted is a nose 120 which stands over the cam 121 fast on the shaft 106 and operates to reset the trip lever in a manner to be hereinafter described.

The pendant arm of the bell crank 114 is forked forming the arms 122—122 which extend approximately half way around the collar 110. The ends of the forks are provided with inwardly projecting pins 123—123 which extend into the groove 111 whereby the collar may be moved on the sleeve 108 between the gear 109 and the clutch face 113.

Fast on the shaft 106 and prevented from rotating thereon by the feather 124 is the cam 125, the form of which is best shown in Figs. 9 and 10. At the inner end, the cam is bored out at 126 and is also provided with a circular recess 127 in its end.

128 is a clutch block which is loosely mounted on the shaft 106, which is also feathered to the shaft by the feather 124. The block 128 is, however, free to move longitudinally on the shaft whereas the cam fits so tightly as to be held in position by friction. The block is bored at 129 in line with the bores 126 in the cam and in the openings thus formed, the springs 130 are placed. Thus it will be seen that the tendency of these springs is to move the block along the shaft away from the cam. The block 128 is provided on its outer face with the teeth 131, which when the disk is moved along under the action of the springs 130 are adapted to engage the teeth 113 of the sleeve 108 and lock the two parts of the clutch together, thus the motion of the constantly running gear 7 will be communicated to the shaft 106.

132 is a projection on the frame 84.

133 is a block which is bored out at 134 to receive the bolts 136 and 137. Between the inner ends of the bolts and the bottom of the bores 134 and 135, I place springs 138—139, which tends to press the bolts 136 and 137 out of the bores. The block 133 is secured in the projection 132 by means of the screws 140.

The clutch block 128 is provided on its outer edge with the cam surface 141, the cam surface extending only part way around the cam as is best shown in Fig 9. The cam surface 141 is so constructed that when the bolt 136 is in the position shown in Figs. 18 and 19, the two parts of the clutch will be held apart, but upon withdrawing the bolt 136 out of the path of the cam, the clutch block 128 will be moved forward under the influence of the springs 130 until the teeth are in engagement. As the clutch continues to rotate the portion of the cam surface 141 which is cut back the farthest will engage behind the side of the bolt 136 and upon continued rotation of the clutch, will move the clutch block 128 back and disengage the clutch. The cam surface 141 is provided at one end with a surface 142 which stands at right angles to the end of the bolt 136 and positively stops the clutch at the end of the rotation. I also provide the clutch block 128 with a V-shaped notch 143 in which the V-shaped end 144 of the pin 137 is adapted to enter to hold the clutch block in its position of disengagement and prevent accidental displacement of the parts. In order to limit the outward throw of the bolt 137, I provide the bolt with a stem 145 which extends back from the bolt through the spring 139, and through the head of the block 133. On the stem outside the block I provide the nuts 146, which by their setting will determine the throw of the bolt under the influence of the spring.

Extending from the side of the bolt 136 is the cam face 147 which extends beyond the teeth 131 of the clutch block. Thus whenever the trip lever 117 allows the spring 119 to pull down the arm of the bell crank lever 114, it will slide the collar 110 upon the sleeve bringing the star wheel 112 under the cam face 147 of the bolt 136 and as the collar rotates one of the star wheel projections will lift the bolt from in front of the clutch disk, allowing the springs to move the clutch disk forward and engage the teeth thereon with the teeth of the sleeve 108 consequently locking the two parts together and causing them to rotate in unison with the shaft 106 for one revolution. At the end of a revolution the cam 141 will force the clutch block 128 back, so that its teeth will disengage from the teeth of the sleeve 108 and then the bolt 137 and the right angle portion 142 of the cam 141 will stop the clutch.

Referring to Figs. 5 and 8: 148—148 are disks carrying the crank pins 149. One of these disks is mounted on each end of the shaft 106 outside of the bearings 107. Depending downwardly from the elevator plate 94 are the arms 150—150 which have at their lower ends the right angled slotted extensions 151—151 in which are mounted the sliding blocks 152—152 with which the crank pins 149 engage and whereby upon the rotation of the shaft 106 the elevator is given a complete reciprocation.

The line follower 93, (see particularly Figs. 9 and 11) which slides in the way 92 in the top of the bracket 91 has connected to its front end a cord 153 which runs over a pulley 154 mounted on the frame of the machines and to the free end of the cord is attached a weight 155. Mounted in a hollow casing 156 on the top of the follower 93 is a plunger 157 which has on its front end a depending finger 158 which extends down into the raceway formed by the projecting portions of the face of the elevator 94 and the inner face of the bar 100, the finger and plunger forming what I term a yielding head. The finger stands behind a line of type supported by the elevator as shown in Fig. 1.

159 is a spring preferably mounted in a recess 160 in the rear end of the plungers 157, the free end of the spring resting against the plug 161 inserted in the end of the bore of the casing 156. In the operation of the machine, the weight 155 acting through the cord 153 pulls the line follower along and the depending finger 158 standing behind the line of type to be discharged, forces the line to the cut off mechanism, which will be hereinafter described, where the type are cut off one at a time. I have found in practice that the weight 155 acting by itself will not operate with sufficient quickness to keep the type up in position to be cut off, and I have therefore added the plunger 157 with its depending finger which, when the line is not at the limit of its movement, will be forced forward by the spring independently of the movement of the follower. The spring is of such a tension that, when the full power of the weight is exerted upon the line follower, the spring will be compressed and ready to push the line forward the instant the restraining influence of the type controlling fingers is removed. In this way, I am enabled to operate the machine at greater speed than is possible if merely the weight was relied upon to keep the line up to the cut off mechanism. As the type are cut off the end of the line, in a manner to be hereinafter described, the line follower moves forward, feeding the remaining type in the line toward the cut off mechanism until the type in front of the line follower have been pushed off the elevator. It is then necessary to draw back the line follower and operate the elevator to feed a new line up into a position to be fed forward to the cut off mechanism. This operation is accomplished by the following mechanism.

Referring particularly to Figs. 5 and 17, 162 is a lever pivoted on the stud 163, projecting out from the side of the frame, the free end of this lever is connected to the line follower 93 by means of the link 164, one end of which is pivoted to the stud 165 carried by the lever 162, and the other end to the stud 166 carried by the line follower.

167 is a lever pivoted at its upper end to a lug 168 and provided with a longitudinal slot 169 in its face (see Fig. 17). 170 is a closed slot cut through a projecting portion on the lever 162.

171 is a block which is adapted to fit in the slot 170, on one side of this block is a collar 172, preferably integral with the block, and 173 is a screw threaded stud projecting out from the face of the block 171, also preferably integral therewith.

174 is a thumb nut which fits the screw threaded stud

173 and when the block 171 is in the slot 170, will clamp the block in any desired position by engaging the sides of the slot between the collar 172 and the nut. Projecting from the collar 172 is a pin 175 preferably integral therewith, on which is loosely mounted a rectangular block 176. This block is adapted to move in the ways 169 in the lever 167. On the side of the lever 167 opposite that having the ways 169, is mounted a cam roller 177 which is adapted to co-operate with the cam 125 on the shaft 106. This cam gives the lever 167 a certain definite throw, but by the form of connection just described, the throw of the lever 162 produced by the lever 167 may be adjusted by loosening the thumb nut 174 and moving the block 171 along the slot 170 which preferably and as shown is graduated. By the relation of the parts, this adjustment effects only the extent of the rearward movement of the lever 162, the lever always starting from the same point no matter what adjustment the parts may have and moving back a distance dependent upon the position of the block 171 in the slot 170. The reason for this movement is that the mechanism which trips the clutch and causes the cam 125 to operate, is tripped when the follower 93 has reached the limit of its forward movement and the parts are in the position shown in Fig. 5, in which position it will be noticed that the slot 170 is parallel with the slot 169, consequently the adjustment of the connection between the two parts at this time will make no difference in the relation of the levers. The lever 167 has a constant throw and preferably I provide the end of the lever with a lug 178 adapted to make contact with the stop 179 cast on the frame to prevent overthrow of the lever by the operation of the cam 125.

The trip lever 117, which I have previously described, passes up through a slot in the bracket 91 carried by the frame and extends up through the bracket into the path of the line follower 93. The lever 117 is provided with a notch 180 as best shown in Fig. 20, the top of the notch being beveled off at 181 as shown. The opening 182 in the bracket 91 through which the lever extends is longer than the width of the lever and lies in the direction of the movement of the follower 93, consequently when the follower strikes the trip lever, the trip lever can have a limited movement in the opening.

183 is a block forming a line lock which is set in the bracket 91 with one end in position to enter the line channel and is provided with a notch 184 in its side which stands over the opening 182 in the bracket 91. One side of the notch 184 is beveled at 185 to match with the bevel 181 of the arm 117, the bevels engage when the trip is in its normal position of rest, and the spring 119 operates to withdraw the line lock 183. In the operation of this trip the line follower strikes the free end thereof and moves the same sufficiently to move the bevel portion of the trip off of the bevel portion 185 of the line locking block 183. The trip will now drop under the influence of the spring 119, release the lock which will be pressed by its spring 186 against the rear end of the line to lock it in the line channel, one end of the spring 186 resting against a block 187 carried by the bracket and extending into the slot in the block 183, the other end of the springs rests against a projection on the block 183. At the same time, the trip will throw in the clutch which will drive the shaft 106 for a single revolution as previously described, and draw back the line follower to its initial position. The cam 121 operating on the nose 120 raises the trip lever 117 up until the beveled edge 181 is above the beveled edge 185 when the spring 119 will swing the end of the arm over the block 183 and bring the beveled edge 181 again into engagement with the face 185 and set the trip ready to be again operated by the line follower, and at the same time withdrawing the line locking block against the tension of the spring 186 from the line channel.

It sometimes happens through carelessness of the attendant that the supply of type becomes exhausted and consequently when the line follower is drawn back no line will be pushed up in front of it. When now the cam roller 177 passes the high portion of the cam 125, the line follower will be free to return under the influence of the weight 155, and if no line were in front of the follower, it would strike a heavy blow against the few type remaining and might break the machine. In order to prevent this, I have provided a device to catch the line follower and hold it, if no line has been fed up by the elevator. This mechanism consists of a rack 188 (Fig. 22) mounted in a way 189 cut in the upper face of the bracket 91, parallel to the ways 92. The way 189 is slightly longer than the rack 188 so that the rack has an endwise play in the way. 190 is a spring interposed between the front end of the rack 188 and a block 191, which forms the end of the way, preferably and as shown this block is bored out to receive the spring. 192 is a pawl pivoted at 193 on the follower, the pawl being provided with a slot 194. This pawl is mounted on the follower adjacent to the casing 156 in which the spring plunger 157 is mounted and the casing 156 has a longitudinal slot in its side through which projects a pin 195 carried by the plunger 157, the pin projecting into the slot 194 of the pawl. This slot is so constructed that when the plunger 157 is in its forward position shown in Fig. 22, which is the position it assumes when the depending finger 158 is not in contact with a line of type, the pawl will be allowed to drop by gravity into engagement with the teeth of the rack 188. When, however, the plunger 157 is moved back by the depending finger 158, coming into contact with the end of a line of type, the pin 195 will engage the edge of the slot 194 and lift the pawl into the position shown in dotted lines in Fig. 22, when it will stand above the top of the rack. The amount of longitudinal movement of the rack 188 is greater than the amount of longitudinal movement of the plunger 157, consequently if there is a line of type of the proper length in front of the plunger 157 and the return lever has been set so as to give the proper return movement to the line follower for the length of line being fed, the plunger 157 will come in contact with the line and raise the pawl 192 out of engagement with the rack 188 before the rack reaches the limit of its longitudinal movement. If, however, the plunger is not moved back by coming into contact with the end of the line, before the rack 188 is stopped, the line follower will be prevented from moving any farther forward under the influence of its weight 155, consequently all danger of breakage due to the line follower striking a blow against the type when a line is not fed up is prevented.

Referring now to Figs. 1 and 29 to 44: The type carriers are arranged upon the disk 15 in the manner previously described so that they project out from the central portions of the disk beyond the periphery thereof. The clutch ring 17, which it will be noted is loosely mounted on the hub of the disk 15, lies in a recess in the upper part of the disk under the type carriers. The projections 18 on this clutch disk extend up, into the plane of the type carriers and are so arranged in relation to the type carriers that there is a projection extending behind each carrier as is best shown in Fig. 3. The clutch ring is yieldingly held in engagement with the latch 29 by means of the springs 34, and thus holds the bolt 24 which stops the rotation of the disk 15 out of engagement with its rack 21. When the type carriers engage a type they are stopped by it and as the clutch ring is constantly moving, one of the lugs 18 will strike the arrested carrier, and if the arrested carrier fails to move at once the arm of the clutch ring in engagement with the bolt will be drawn off by stoppage of the disk, the bolt will be released and the machine stopped.

Cut in the under side of the cover 19 is a groove 196 in which is loosely mounted what I term an assisting ring 197. This assisting ring is preferably L-shaped in cross section as is best shown in Fig. 46 which is a fragmentary detail view. Projecting from the under face of this ring are a series of lugs 198, one of these lugs being adapted to stand just behind the casing of each carrier when the same is drawn back as is best shown in dotted lines in Fig. 2. 199 are springs, one end of each of which is connected to the assisting ring and the other to the cover plate 19 to hold the lugs 198 in position. The function of this ring is to assist the springs of the type carrier when they have been moved from this position while cutting off type to return the carriers to their normal position.

Referring particularly to Fig. 2, 200 is a type channel through which the type are fed by the line forcer mechanism and from the end of which they are taken one at a time by the type carriers. 201 is a roller mounted over the inner end of the channel in position to press down the type before they are cut off the line by the type carriers in order to insure that the type shall rest on their feet in the channel and consequently be in proper position to be taken by the carriers. This wheel is mounted on an arm 202 held in position, by a suitable stud 203 secured to the frame.

Referring particularly to Figs. 1, 2, 11, and 40 to 44, 204 is a guide, the face of which forms one of the sides of the type channel 200. Mounted in a slot in the guide 204 is a slide 205 which at its outer end is provided with a pair of fingers 206 which extend across the inner end of the channel 200. The slide 205 is provided with a slot 207 cut therein and projecting into this slot is one end of the lever 208 fast on a shaft 209 mounted in a bearing in the frame of the machine. 210 is a collar fast on the shaft 209 and 211 is an arm projecting out from the side of this collar. Pivoted to the arm 211 is one end of the link 212, the other end of which is connected to the arm 213. The lever 213 is fast on the shaft 214 mounted in the bearing 215, on the ring 82. The shaft 214 extends down into a recess 216 on the under side of the ring 82. 217 is a lever secured on the lower end of shaft 214, and standing in the recess 216 (see Figs. 1, 2, 41, and 42.)

81 is the cam slot cut in the under side of the ring 82 and extending all the way around the ring, into which project the cam rollers 79 of the type carriers as previously described. The end of the lever 217 has a nose 218 which is formed with a cam face 219 on its end and this nose projects through an opening 220 cut in the wall, separating the recess 216 from the cam slot 81.

Referring now to Figs. 1 and 39 to 42, 221 is a cam lever fast on the lower end of the shaft 209, the free end of this lever carries a cam roller 222 running in the cam groove cut in the edge of a disk 223 mounted on the stud shaft 224 projecting out from the side of the upright 1.

225 is a gear fast on the hub of the cam disk 213 and meshing with this gear is the gear 6 on the main shaft 3. The cam groove in the disk 223 is so constructed that it will oscillate the lever 221 once during its rotation and the relative size of the gears 225 and 6 are such that the lever 221 will be oscillated thirty-six times during each revolution of the shaft 3. There are thirty-six carrier arms equally distributed around the circle, and the lever 221 is arranged to oscillate as each carrier passes the type channel. The oscillations of the arm 221 are communicated to the levers 208 and 217. The type controlling fingers 206 as heretofore described are connected to and oscillated by the lever 208, hence they will make one outward and inward movement as each carrier comes to the type channel and passes, the movement of the fingers are so timed that they will move out as the carrier approaches and allow a type to be protruded and will be withdrawn as soon as the type has been taken away by the carriers. When each type carrier approaches the channel 200 through which the type are fed, the parts of the carrier are in the position shown in Fig. 44, that is to say the casing 72 has been drawn back by the cam groove 81, and the outer edges of the notches 76 in the sides of the casing 72, have moved the ejector 49 and the side plate 59 back by coming into contact with the projections 50 and 61.

The normal position of the type controlling fingers in their retracted position, permits a type to protrude from the type channel far enough to engage the face 48 of a type carrier, and arrest its motion. The cam 223 is so timed that at this instant it will move the lever 208 and permit the type controlling fingers and the type to move out under the pressure of the follower 93, into the type receiving chamber of the carrier. As each carrier is yieldingly mounted it will stop as soon as the face 48 has made contact with a type and as the disk 15 continues to revolve, the carrier will be moved from a position shown in full lines in Fig. 41 to the position shown in dotted lines. The exact amount of movement, however, will depend upon the thickness of the type being cut off. As the lever 221 moves, it not only controls the movement of the fingers 206, but also operates the lever 217 and moves the nose 218 forward which at this time is in contact with the cam roller 79 on the carrier. The pressure of the lever 217 on the cam roller 79 moves the casing 72 slightly farther back causing the side plate 59 and the ejector 49 to move back. The object of moving back the side plate is to allow a type to enter with very little friction and the object in moving back the ejector is to allow a large type to be delivered to the carrier without the type coming into contact with the ejector. The recession of the casing 72 under the influence of the cam groove 81 will bring it into the path of a lug 198 on the assisting ring 197 so that as the carriers stop after engaging the type the springs 199 of the assisting ring will be extended and an additional tension put upon the carrier which is stationary at this time. Just as soon as the fingers 206 have moved forward far enough to bring the inner side of the type beyond the outer end of the channel 200 on the side opposite the fingers, the carrier will move forward against its stop 41 under the influence of the spring 38 and the springs 199 of the assisting ring, carrying the engaged type with it, thus cutting off a single type, no matter what the thickness of the type may be. As the carrier moves forward, the roller 79 passes over the cam face 219 of the nose 218 and allows the casing 72 to move forward under the influence of the springs 55 and 68 and allow the side plate to return to the position shown in Fig. 42, where it will be seen that it extends out as far as the end of the face 48 thus securely holding the type in position. The ejector has likewise been allowed to move forward until it has come into contact with the side of the type and consequently the ejector will force the type out of the carrier as soon as an opening is reached into which the type can pass.

The type which are to be distributed by the machine are each provided with a set of nicks on one of its sides, there being a different set of nicks for each letter and the nicks of no two letters being placed alike. The type receiving channels are arranged in a segment of a circle and extend out radially from the ring.

Referring now to Figs. 2, 23 to 28, 226 are a series of radial blocks bolted to the top surface of the frame 8 and so located as to form a series of radial channels between them. These blocks are narrower at their front end than at their rear ends so as to form type channels having parallel walls and slightly greater than the type width. Each of these blocks upon the front end of one of its vertical sides is provided with one or more wards 227, these wards are located upon the front end of the same side of all blocks. In practice, I have used from one to four wards in different combinations so as to give a different combination of wards for every type. The type intended to be introduced into each of the channels formed by adjacent blocks are nicked to correspond with the wards of the particular channel into which it is desired to introduce them. Hence no type will enter any channel except the one designed for it. As each of the type carriers revolve in front of all the type channels, a type will be carried past the channels not designed to receive it until it comes to the channel which has the wards corresponding to its nicks, then the ejector 49 in the carrier will, under the action of the spring 55, force the type into the channel, the carrier being arrested by the side of the type coming into contact with the side wall of the channel until the type has been pushed entirely out of the type carrier, when the type carrier will be released and moved forward into its normal position under the action of its spring 38. When the carriers are passing in front of the receiving channels, the casing 72 stands in the position shown in Fig. 43, in which the operation of delivering a type to a type receiving channel is shown. It will be seen that from this figure that the cam 81 has, before the carriers reached the first receiving channel, allowed the casing to move out to the position shown in Figs. 32 and 43. Consequently the cam projection 78 will be in position to force the type entirely into the channel. 228 is a spring mounted in the side of each of the blocks 226 having a curved portion 229 which projects into the type channel. The curve of this spring narrows the channel a short distance from its end and the curve is so located for each channel that when the type belonging to each channel are forced into it, they will be caught and held by the spring at a distance from the end of the channel about equal to the thickness of the particular type. This is accomplished by so plotting the cam groove 81 that each casing 72, carrying the cam projections 78 as it passes each receiving channel will project its cams inward beyond the end of the channel a distance approximately equal to the thickness of the type for that particular channel, thus each type is forced into its channel a distance proportional to its thickness and on to the projecting portion of the side spring by which the last type inserted will be held until another type pushes it off of the spring. By this means the type are prevented from falling over.

In order that the channel may hold a large number of type I extend them back from the block 226. The extensions of the type receiving channels consist of a flat plate 230 supported upon a ledge formed on the outer edge of the upper surface of the circular part 8 of the frame and by the radial supporting arms 231, Fig. 4. This plate has projecting upwardly from the outer edge thereof, the pins 232 to which are secured the springs 233. To these springs are secured the vertical plates 234 which form the side walls of the type receiving channels. The blocks 226 are provided at their outer ends with vertical slots 235 in which rest pins 236, having springs 237 bent around them, the free ends of each spring being connected to the inner ends of the plates 234 as best shown in Figs. 23 and 24.

It frequently happens, in the composition of matter, that a type may be set with its character up side down, which brings the nicks on the wrong side of the type for the wards 227 or an improperly nicked type may be used or one of a different font, I therefore provide means whereby any such type will be rejected before it reaches the first receiving channel. In other words this means will remove any type which for any reason cannot be distributed in this machine. This is accomplished by providing each type on the side opposite that having the distributing nicks with a single nick which I term a registry nick which will register with the ward 65 on the side plate 59 when the type is properly positioned in the carrier. The registry nick also performs another very important function, it holds the type down on their feet so that the distributing nicks may register with the wards in the receiving channels. It will be seen that unless the registry nick in the type registers with the ward 65, the side plate carrying the ward 65 cannot move forward because the ward will engage the side of the type, but the type will be pressed forward by both plates independently, the side plate acting on one corner only, and the ejector on the back, as soon therefore as the type in advancing reaches an opening, the corner opposite the side plate being first freed will be forced outward by the side plate and tilted on the corner of the opening and forced into the opening by the combined action of side plate and ejector.

In order to utilize this action to remove any type held in this manner, I provide (see Figs. 2, 26, to 28) between the channel 200 and the first type receiving channel an opening 238 cut in the block 200ª which forms one side of the line channel 200. In the other side of the opening 238, I pivot a plate 239 on a pin 240, the pivot 240 being located near the back of the plate. 241 is a spring which presses against the side of the plate near its inner end and tends to force the plate toward the opposite side of the opening. 242 is a screw having an enlarged head against which the beveled edge 243 on the back of the plate is adapted to contact, to limit the forward movement of the free end of the plate under the influence of the spring 241. By adjusting the screw 242, the amount of this inward movement may be varied. The front end of the plate is provided with the inward projection 244 and the opposite wall of the opening is provided with an inward projection 245 which extend toward each other as shown in Fig. 26. The distance between the inner edges of these projections is less than the width of a type, consequently any type which is squarely held in the type carrier will pass over the opening, but, if a type is misplaced in the carrier so that the side plate cannot move forward to the position shown in Fig. 42, but is held back as shown in Fig. 26, the type will be tilted as heretofore stated and the corner of the type will catch on the projection 244. The further movement of the carrier will swing the plate 239 on its pivot against the tension of the spring 241 until the opening between the projections 244 and 245 is as large as the width of the type, when the ejector will under the influence of its spring 55 force the type into the opening. As none of the combination nicks or what I term distributing nicks, are of the same height as the registry nick in the type, it follows that any type incorrectly set up in the matter to be distributed or any type which is not adapted for use in the machine will be delivered at this first channel and not be carried to the type receiving channels where it might catch and cause a stoppage of the machine.

I have illustrated in the drawings and described in the specification what I believe to be the preferred form of my invention and I have shown and described the preferred mechanical means for accomplishing the results sought but I desire to have it understood that the particular mechanical means shown and described are not essential to my invention and that other mechanism can be provided and substituted for those shown without departing therefrom and my invention includes all such mechanical changes and substitutions.

While I had described the machine as operating upon type, it will be evident that it could be used equally well to distribute matrices or the like and I desire to have it understood that the word "type" as used in the specification and claims of this application is intended to cover not only type but matrices and the like.

While the mechanisms which I have shown and described in this application are particularly adapted for use in a type distributing machine, I desire to have it understood that I contemplate the use of such mechanisms in other relations from those shown, and the claims of this application are intended to cover the use of these mechanisms not only in a distributing machine but in any machine in which type, matrices or the like may be handled.

What I claim as new, and desire to secure by Letters Patent, is:—

1. In a type handling machine, the combination with a channel through which a line of type may be fed, of a follower to feed a line through the channel, means to operate the follower, and means operating to arrest the movement of the follower when it is not in contact with the line.

2. In a type handling machine, the combination with a channel, of a follower adapted to force a line through the channel, means to operate the follower to feed the line through the channel, a yielding head carried by the follower which makes contact with the end of the line to be fed, and means controlled by the yielding head to arrest the movement of the follower when the yielding head is not in contact with the end of the line.

3. In a type handling machine, the combination with a channel, of a follower, means for forcing the follower through the channel, means for returning the follower, means for holding the follower stationary, and means actuated by the contact of the follower with a type line for freeing the follower from its holding device.

4. In a type handling machine, the combination with a channel, of a follower adapted to force a line of type through the channel, a rack mounted adjacent to the channel, a device carried by the follower and adapted to engage the rack, and means on the follower and connected to the rack engaging device, whereby the rack engaging device will be held out of engagement with the rack when the follower is in contact with a line.

5. In a type handling machine, the combination with a channel, of a follower adapted to force a line of type through the channel, a rack mounted adjacent to the channel and adapted to have a limited movement, a device carried by the follower and adapted to engage the rack, and means on the follower and connected to the rack engaging device, whereby the rack engaging device will be held out of engagement with the rack when the follower is in contact with a line.

6. In a type handling machine, the combination with a channel, of a follower adapted to force a line of type through the channel, a rack adjacent to the channel, a pawl carried by the follower and adapted to engage the rack, and means actuated by the contact of the follower with the line, whereby the pawl will be held out of engagement with the rack when the follower is in contact with the line.

7. In a type handling machine, the combination with a channel, of a follower adapted to force a line of type through the channel, and a yielding head carried by the follower which makes contact with the end of the line.

8. In a type handling machine, the combination with a channel, of a follower adapted to force a line of type through the channel, a yielding head in the follower which makes contact with the end of the line to be fed, and a spring behind the head to force it out of the follower and against the end of the line.

9. In a type handling machine, the combination with a channel, of a follower adapted to force a line of type through the channel, a head in the follower, means for forcing the head out of the follower, and a device operated by the movement of the head to arrest the movement of the follower when the head is forced out of the follower.

10. In a type handling machine, the combination with a channel, of a follower adapted to force a line of type through the channel, a head carried by the follower which contacts with the end of the line, means for moving the head in relation to the follower against the end of the line, a device carried by the follower and connected to the head, a rack adjacent to the channel and adapted to be engaged by the device carried by the follower, the head operating to hold the device out of engagement with the rack when the head is in contact with the line.

11. In a type handling machine, the combination with a channel, of a follower, means to cause the follower to force type through the channel, a cam adapted to return the follower and means whereby the length of the return movement of the follower can be varied.

12. In a type handling machine, the combination with a channel, of a follower, means to cause the follower to force type through the channel, a cam having a constant throw adapted to return the follower and means whereby the length of the return movement of the follower can be varied.

13. In a type handling machine, the combination with a channel, of a follower, means to cause the follower to force a line of type through the channel, a cam, a lever connected to the follower and operated by the cam, an actuating device for the cam, and means connecting the lever and follower whereby the length of return movement can be varied.

14. In a type handling machine, the combination with a channel, of a follower, means to operate the follower to force a line of type through the channel, and means to return the follower to engage a new line, said means consisting of a lever, a cam having a constant throw operating the lever, a second lever connected to the follower and adjustable connections between the two levers to vary the extent of return movement of the follower.

15. In a type handling machine, the combination with a channel, of a follower, means to operate the follower to force a line of type through the channel, and means to return the follower to engage and feed forward a new line, consisting of a pivoted lever, a cam having a constant throw operating on the free end of the lever, a second lever pivoted at one end and connected to the follower at the other end, and an adjustable connection connecting the levers intermediate their ends whereby the adjustment of the connection will vary the extent of the return movement of the follower.

16. In a type handling machine, the combination with a channel, of a follower, means to operate the follower to force a line of type through the channel, and means to return the follower to engage and feed forward a new line, consisting of a pivoted lever, a cam having a constant throw operating on the free end of the lever, a second lever pivoted at one end and connected to the follower at the other end, a slot in the second lever intermediate its ends, a channel in the first lever and an adjustable connection one end of which is adapted to stand in the channel of the first lever, while its other end is secured in the slot of the second lever, whereby the extent of the return movement of the follower may be adjusted.

17. In a distributing machine, the combination with a disk, on which are mounted a set of type carriers, of a radial bolt carried by the disk, means constantly tending to move the bolt radially of the disk, a device adjacent to the disk adapted to be engaged by the bolt when moved by its actuating mechanism, a latch for holding the bolt against the action of its actuating mechanism and connections between the carriers and the latch, whereby they may operate the latch to release the bolt.

18. In a distributing machine, the combination with a disk on which are mounted a set of yielding type carriers, of a radial bolt carried by the disk, means constantly tending to move the bolt radially of the disk, a device adjacent to the disk adapted to be engaged by the bolt when moved by its actuating mechanism, a latch for holding the bolt against the action of its actuating mechanism, a ring on the disk, the ring engaging the latch to hold the bolt against the action of its actuating mechanism.

19. In a distributing machine, the combination with a disk on which are mounted a set of yielding type carriers, of a radial bolt carried by the disk, means constantly tending to move the bolt radially of the disk, a device adjacent to the disk adapted to be engaged by the bolt when moved by its actuating mechanism, a latch for holding the bolt against the action of its actuating mechanism, a ring on the disk, the ring being provided with means adapted to be engaged by the carriers when they have yielded a given amount to release the latch, the ring engaging the latch to hold the bolt against the action of its actuating mechanism.

20. In a type distributing machine, the combination with a disk, of a set of yielding type carriers mounted on the disk, a ring supported by the disk beneath the carriers and adapted to be engaged by the carriers, springs yieldingly holding the ring, a second ring supported above the carriers and adapted to engage the carriers and springs yieldingly holding the second ring in engagement with the carriers when they are in contact.

21. In a type distributing machine the combination with a series of carriers, of a ring supported beneath the carriers and adapted to be engaged by the carriers, means to allow said ring to yield when pressure is applied to it through a carrier, a second ring mounted above the carriers and means to allow said second ring to yield when pressure is applied to it through the carriers.

22. In a distributing machine, the combination with a series of yielding type carriers arranged radially, of a disk below the carriers and provided with a series of devices one for each carrier in the path of the carriers to be engaged by the carriers, a lock controlled by the disk and operated by the engagement of the carriers with the disk, a second disk above the carriers provided with a series of devices one for each carrier to engage and propel the forward end of the carriers when in contact with them, both disks being arranged to travel with the carriers and at the same time to yield to the stoppage of a single carrier, the first disk operating the lock to stop the carriers and connected parts when a carrier has yielded more than a predetermined distance and the other disk operating to restore the carrier which has yielded to its normal position when it is released.

23. In a distributing machine, the combination with a series of yielding type carriers arranged radially, of a disk below the carriers and provided with a series of lugs, one for each carrier in the path of the carriers to be engaged by the carriers, a lock controlled by the disk and operated by the engagement of the carriers with the lugs, a second disk above the carriers provided with a series of lugs one for each carrier to engage and propel the forward end of the carriers, both disks being arranged to travel with the carriers and at the same time to yield to the stoppage of a single carrier, the first disk operating the lock to stop the carriers and connected parts when a carrier has yielded more than a predetermined distance and the other disk operating to restore the carrier which has yielded to its normal position when it is released.

24. In a type distributing machine, a type carrying device provided with a type receiving chamber having one of its side walls fixed and the other movable in a plane parallel to the fixed wall, a movable ejector forming the rear wall of the chamber and means to move the movable side wall and the ejector.

25. In a type distributing machine, a type carrying device provided with a type receiving chamber having one of its side walls fixed and the other movable in a plane parallel to the fixed wall, a movable ejector forming the rear wall of the chamber, and means to move the movable side wall and the ejector together as well as in relation to each other.

26. In a type distributing machine, a type carrying device provided with a type receiving chamber having one of its side walls fixed and the other movable, one of the side walls carrying a registering ward adapted to coact with a nick in the type, a movable ejector forming the rear wall of the chambers and means to move the movable side wall and the ejector.

27. In a type distributing machine, a type carrying device provided with a type-receiving chamber having one of its side walls fixed and the other movable, the movable side wall carrying a registry ward adapted to coact with a nick in the type, a movable ejector forming the rear wall of the chamber and means to move the movable side wall and the ejector.

28. In a distributing machine, a type carrying device provided with a type receiving chamber having a side wall movable in a plane parallel to the plane of the opposite wall.

29. In a distributing machine, a type carrying device provided with a type receiving chamber having a side wall movable in a plane parallel to the plane of the opposite wall and means to hold the type, when in the chamber, on its foot.

30. In a type distributing machine, a type carrying device provided with a type receiving chamber having a movable side wall, said wall being provided with means to register with a co-operating part on the type.

31. A type distributing machine, a type carrying device provided with a type receiving chamber having one of its side walls fixed and the other movable in a plane parallel to the fixed wall.

32. A type distributing machine, a type carrying device provided with a side wall movable in a plane parallel to the plane of the opposite wall and a movable rear wall.

33. In a type distributing machine, a type carrying device provided with a type receiving chamber, one of the walls of the chamber being provided with a ward integral with one of the walls thereof to hold a type, carried in the chamber, on its foot.

34. In a type distributing machine, a type carrying device provided with a type receiving chamber, one of the walls of the chamber being provided with a ward integral with the walls thereof to register with a co-operating part on the type.

35. In a type distributing machine, a type carrying device provided with a type receiving chamber, one of the walls of the chamber being provided with an integral ward adapted to coact with a nick in the type.

36. In a type distributing machine, a type carrying device provided with a type receiving chamber, a movable side wall for the chamber and a movable casing surrounding the chamber, means to move the casing in relation to the chamber, and means whereby the movement of the casing may move the side wall.

37. In a type distributing machine, a type carrying device comprising an arm on which is formed one of the side walls of a type receiving chamber, a movable ejector carried by the arm, the front of which forms the rear wall of the chamber, a movable side plate which forms the other side wall of the chamber, and means to move them.

38. In a type distributing machine, a type carrying device comprising an arm on which is formed one of the side walls of a type receiving chamber, a movable ejector carried by the arm, the front face of which forms the rear wall of the chamber, a movable side plate which forms the other side wall of the chamber, and a movable casing surrounding the chamber, means to move the casing in relation to the chamber, and means whereby the movement of the casing may move the ejector and movable side plate.

39. In a type distributing machine, a type carrying device comprising an arm on which is formed one of the side walls of a type receiving chamber, a movable ejector carried by the arm, the front face of which forms the rear wall of the chamber, a movable side plate which forms the other side wall of the chamber, projections on the side plate and ejector whereby they may be moved, and means co-operating with the projections to move them, and springs forcing the ejector and movable side wall outwardly.

40. In a type distributing machine, a carrier adapted to carry a single type, the carrier being provided with means to register with a co-operating part on the type when the type is in proper position in the carrier, and a device adapted to catch and remove the type from the carrier when the means on the carrier and the part on the type do not register.

41. In a type distributing machine, a carrier adapted to carry a single type, the carrier being provided with means to register with a co-operating part on the type when the type is in proper position in the carrier, and a channel to which all type will be delivered that do not have their co-operating part in register with the part on the carrier.

42. In a type distributing machine, a carrier adapted to carry a single type, the carrier being provided with means to co-operate with a corresponding part on the type when the type is in proper position in the carrier and permit the type to remain in the carrier, means to eject the type in a tilted or upset position when the type is in an improper position in the carrier and a channel adapted to receive the upset or tilted type.

43. In a type distributing machine, a carrier adapted to carry a single type, the carrier being provided with means to co-operate with a corresponding part on the type when the type is in proper position in the carrier and permit the type to remain in the carrier, means to eject the type in a tilted or upset position when the type is in an improper position in the carrier and a channel adapted to receive an upset or tilted type, and a catch adapted to engage the tilted or upset type and direct them into the channel.

44. In a type distributing machine, a carrier adapted to carry a single type, the carrier being provided with means to register with a co-operating part on the type when the type is in proper position in the carrier, a channel provided with a catch to remove the type from the carrier when the means on the carrier and the part on the type do not register.

45. In a type distributing machine, a carrier adapted to carry a single type, the carrier being provided with means to register with a co-operating part on the type when the type is in proper position in the carrier, a channel provided with a pivoted catch to remove the type from the carrier when the means on the carrier and the part on the type do not register.

46. In a type distributing machine, a carrier adapted to carry a single type, the carrier being provided with means to register with a co-operating part on the type when the type is in proper position in the carrier, a channel provided with a spring pressed pivoted catch adapted to engage the type to remove the type from the carrier when the means on the carrier and the part on the type do not register.

47. In a type distributing machine, a carrier adapted to carry a single type, the carrier being provided with means to register with a co-operating part on the type when the type is in proper position in the carrier, a channel having a stationary side and a yielding side, the yielding side having its front end provided with a projection extending into the channel to contract the mouth of the channel, the projection being adapted to engage the type and remove them from the carrier when the means on the carrier and the part on the type do not register.

48. In a type distributing machine, the combination with a series of receiving channels, each adapted to receive a certain kind of type, of a series of carriers each adapted to hold a type and move the type past the channels until they come in front of the proper channel and then deliver them to that channel, a supplementary channel past which the type are carried before they reach the other channels, the supplemental channel being adapted to receive only type which cannot be delivered to the receiving channels.

49. In a type distributing machine, the combination with a series of receiving channels, each adapted to receive a certain kind of type, of a series of carriers each adapted to hold a type and move the type past the channels until they come in front of the proper channel and then deliver them to that channel, a supplemental channel past which the type are carried before they reach the other channels, the supplemental channel being adapted to receive all the type which cannot be delivered to the receiving channels.

50. In a type distributing machine, the combination with a series of receiving channels each adapted to receive a certain kind of type, of a series of carriers each adapted to hold a type and move the type past the channels until they come in front of the proper channel and then deliver them to that channel, means on the carrier whereby a type that can be delivered to a channel is differently held from one that cannot be delivered, a supplemental channel past which the type are carried before they reach the receiving channels, the supplemental channel being adapted to receive only type that cannot be delivered to the receiving channels, the delivery of the type to the supplemental channel being effected by the manner in which it is held in the carrier.

51. In a type distributing machine, the combination with a series of receiving channels each adapted to receive a certain kind of type, of a series of carriers each adapted to hold a type and move the type past the channels until they come in front of the proper channel and then deliver them to that channel, means on the carrier adapted to register with a part on the type whereby the type may be properly held in the carrier, a supplemental channel past which the type are carried before they reach their receiving channels, the supplemental channel being adapted to receive type improperly held in the carrier.

52. In a type distributing machine, a carrier provided with a type receiving chamber, a movable side wall for the chamber, the movable side wall being provided with means to register with a co-operating part on the type when the type is in proper position in the chamber, a spring tending to force the side wall to its outer position whereby when the means carried by the side wall does not register with the co-operating part on the type, the movable side wall will be pressed back by the type against the tension of the spring.

53. In a type distributing machine, a carrier provided with a type receiving chamber, a movable side wall for the chamber, a spring tending to force the side wall to its outer position, the side wall being provided with means to register with a co-operating part on the type when the type is in proper position in the chamber, whereby when the means carried by the side wall does not register with the co-operating part on the type, the movable side wall will be pressed back by the type against the tension of the spring and a device adapted to catch and remove the type from the carrier when the side wall is pressed back.

54. In a type distributing machine, a series of type receiving channels arranged radially and formed by a series of tapered independent blocks in such relation to each other as to form a series of radial type channels, each block being provided with a series of registering devices to co-operate with similar registering devices on type adapted to be inserted in the channels.

55. In a type distributing machine, a series of blocks adapted to be secured upon a base of circular form so as to form intervening radial channels, said blocks having tapered side faces and a series of registering devices on one or both of the tapered faces formed integral with the block.

56. In a type distributing machine, a series of receiving channels, an extension of each receiving channel, formed of a pair of plates which are pressed toward each other by springs located adjacent to each end of the plates.

57. In a type distributing machine, the combination with a series of type receiving channels formed by a series of blocks spaced apart to form the channels of springs supported in the rear ends of the blocks, plates secured to the springs to form extensions of the type receiving channels and means to hold the other ends of the plates in position.

58. In a type distributing machine, the combination with a series of type receiving channels formed by a series of blocks spaced apart to form the channels of springs supported in the rear ends of the blocks, a plate secured to each end of each spring to form extensions of the type receiving channels.

59. In a type distributing machine, the combination, with a series of type receiving channels formed by a series of blocks, spaced apart to form the channels, of grooves cut in the rear end of each block, a spring supported in each groove, plates secured at one end to the ends of the springs to form extensions of the type receiving channels.

60. In a type distributing machine, the combination with a series of type receiving channels formed by a series of blocks spaced apart to form the channels, of springs supported in the rear ends of the blocks, plates secured to the springs to form extensions to the type receiving channels, a second set of springs supported a suitable distance back from the block to which the plates are also secured.

61. In a type distributing machine, the combination with a galley provided with a side stick adapted to hold a column of type, of a line channel on a different plane from the galley, a line transferrer, and means to operate the same to take a line from the end of the galley and move it to the line channel, and a device forming a part of the side stick and adapted to move over the transferrer when the line passes thereon to prevent the end type of a line from falling and means to move the lines successively on to the transferrer.

62. In a type distributing machine, the combination with a galley adapted to hold a column of type, of a side stick on the galley, a line channel on a different plane from the galley, a line transferrer and means to operate the same to take a line from the end of the galley and move it to the line channel, a pivoted dog mounted in the end of the side stick and adapted to move over the transferrer when a line passes thereon to prevent the end type of a line from falling and means to move the lines successively on to the transferrer.

63. In a type distributing machine, the combination with a galley provided with a side stick adapted to hold a column of type, of a line channel on a different plane from the galley, a line transferrer provided with a shoulder and means to operate the same to take a line from the end of the galley and move it to the line channel, and a device forming a part of the side stick and adapted to move over the shoulder of the transferrer when the line passes thereon to prevent the end type of a line from falling and means to move the lines successively onto the transferrer.

64. In a type distributing machine, the combination with a galley adapted to hold a column of type, of a side stick on the galley, a line channel on a different plane from the galley, a line transferrer provided with a shoulder, and means to operate the same to take a line from the end of the galley and move it to the line channel, a pivoted dog mounted in the end of the side stick and adapted to move over the shoulder of the transferrer when a line passes thereon to prevent the end type of a line from falling and means to move the lines successively onto the transferrer.

65. In a type distributing machine, the combination with a series of carriers, each provided with a movable ejector, of a cam adapted to actuate the ejectors, a stationary channel from which the carriers are adapted to take type one at a time and in front of which each carrier dwells as it is receiving a type and means adapted to move the ejector while the carrier stands in front of the channel.

66. In a type distributing machine, the combination with a series of carriers, each provided with a movable side plate, forming one of the walls of the type receiving chamber, of a cam adapted to actuate the movable side wall, a stationary channel from which the carriers are adapted to take type one at a time and in front of which each carrier dwells as it is receiving the type, and means adapted to move the side wall while the carrier stands in front of the channel.

67. In a type distributing machine, the combination with a series of carriers, each provided with a movable ejector and a movable side plate, the side plate forming one of the walls of the type receiving chamber, of a cam adapted to actuate the movable ejector and side plate, a stationary channel from which the carriers are adapted to take type, one at a time and in front of which each carrier dwells as it is receiving the type, and means adapted to move the ejector and side wall while the carrier stands in front of the channel.

68. In a type distributing machine, the combination with a series of carriers, of a cam adapted to move a part of the carrier, a stationary channel from which the carriers are adapted to take type, one at a time and in front of which each carrier dwells as it is receiving the type, and means adapted to move the movable part of the carrier while the carrier stands in front of the channel.

69. In a type distributing machine, the combination with a series of carriers, each provided with a movable part, of a cam adapted to actuate the movable part of the carrier, and means for giving the movable part of the carrier a movement in addition to that imparted by the cam.

70. In a type distributing machine, the combination with a series of carriers, each provided with a movable part, and each adapted to receive a single type, of a stationary channel from which carriers are adapted to take type one at a time, and in front of which each carrier dwells as it is receiving type, a type controlling finger extending across the mouth of the channel to hold the type in the channel and means to actuate the finger and allow the type to advance through the channel when a carrier stands opposite the channel, and means to actuate the movable part of the carrier which is opposite the channel.

71. In a type distributing machine, the combination with a series of carriers, each provided with a movable part, and each adapted to receive a single type, of a stationary channel from which the carriers are adapted to take type one at a time, and in front of which each carrier dwells as it is receiving a type, a finger extending across the mouth of the channel to hold the type in the channel and means to advance the finger to allow the type to advance through the channel and means to actuate the movable part of the carrier which is opposite the channel, the finger actuating means and the actuating means for the movable part of the carrier being connected together to operate simultaneously.

72. In a type distributing machine the combination with a type carrier of a series of type receiving channels and means for forcing type from the carrier into the channels a distance proportionate to the thickness of the type.

73. In a type distributing machine the combination with a series of type receiving channels, of a type carrier adapted to receive a type and carry it to a type receiving channel into which it is to be inserted, means carried by the carrier for ejecting the type from the carrier into the receiving channel a distance proportionate to the thickness of the type.

74. In a type distributing machine the combination with a series of type receiving channels, of a carrier adapted to receive and convey a type to a receiving channel, means for ejecting the type from the carrier into the channel and means for forcing the type through the channel a distance proportionate to the thickness of the type.

75. In a type distributing machine the combination with a series of type receiving channels, of a carrier adapted to receive and convey a type to a receiving channel, an ejector carried by the carrier for ejecting the type from the carrier into the receiving channel and cams carried by the carrier for forcing the type in the channel a distance proportionate to the thickness of the type and means to give to the cams the desired throw.

76. In a type distributing machine the combination with a series of type receiving channels, a spring located in the side of each channel and adapted to hold a type pressed between it and the opposite side, of a carrier adapted to receive and convey a type to a receiving channel, an ejector carried by the carrier for ejecting the type from the carrier into the receiving channel and cams carried by the carrier for forcing the type in the channel a distance proportionate to the thickness of the type and means to give to the cams the desired throw.

77. In a distributing machine the combination with a series of receiving channels each adapted to receive a different type, of a series of carriers adapted to receive and convey a series of types to the receiving channels, an ejector carried by each carrier and adapted to eject the type carried into its receiving channel and means adapted to force all type into their receiving channels a distance proportionate to their thickness.

78. In a distributing machine the combination with a series of receiving channels each adapted to receive a different type, of a series of carriers adapted to receive and convey a series of types to the receiving channels, an ejector carried by each carrier and adapted to eject the type carried into its receiving channel and means carried by each carrier and co-operating with actuating devices, to force each type into its receiving channel a distance proportionate to its thickness.

79. In a distributing machine the combination with a series of receiving channels each adapted to receive a different type, of a series of carriers adapted to receive and convey a series of types to the receiving channels, an ejector carried by each carrier and adapted to eject the type carried into its receiving channel, and a cam carried by each carrier and co-operating with means for actuating the cam to force each type into its receiving channel a distance proportionate to its thickness.

80. In a distributing machine the combination with a series of receiving channels, each adapted to receive a different type, of a series of carriers adapted to receive and convey a series of types to the receiving channels, an ejector carried by each carrier and adapted to eject the type carried into its receiving channel, and a cam carried by each carrier and co-operating with a cam groove for actuating the cam to force each type into its receiving channel a distance proportionate to its thickness.

81. In a distributing machine the combination with a series of receiving channels arranged radially and each adapted to receive a different type, of a series of radially arranged carriers adapted to receive and convey a series of types to the series of receiving channels and means adapted to force each type into its receiving channel a distance proportionate to its thickness.

82. In a distributing machine the combination with a series of receiving channels arranged radially and each adapted to receive a different type, of a series of radially arranged carriers adapted to receive and convey a series of types to the series of receiving channels, a cam carried by each carrier and adapted to force the type into the receiving channels, and a circular cam groove so located as to control the throw of all cams so as to force each type into its channel a distance proportionate to its thickness.

83. In a type handling machine, the combination of a type channel cut away on one side at one end, means for forcing a line of type through the channel, a controlling device adapted to hold the line in the channel against the action of the forcing device, the controlling device receiving the type at the point where the channel is cut away and holding them until they are removed.

84. In a type handling machine, the combination with a channel, of a follower, means to operate the follower to force a line of type through the channel, means to return the follower to engage a new line and spring pressed means to engage the type in the channel when the follower is returned to lock the type in the channel.

85. In a type handling machine, the combination with a channel, of a follower, means to operate the follower to force a line of type through the channel, means to return the follower to engage a new line and spring pressed means to engage the rear end of the line when the follower is returned to prevent the type being drawn back by the follower when it returns.

86. In a type handling machine, the combination with a channel, of a follower, means to operate the follower to force a line of type through the channel, means to return the follower to engage a new line, a trip lever adapted to trip in the follower returning means, and means operated by the trip lever to lock the type remaining in the channel and hold them while the follower is returned.

Signed by me at Boston, Mass., this 21st day of July, 1904.

ALEXANDER DOW.

Witnesses:
EDMUND W. YOUNG,
DAVID GOVAN.